United States Patent
Renders et al.

(10) Patent No.: US 11,562,039 B2
(45) Date of Patent: Jan. 24, 2023

(54) SYSTEM AND METHOD FOR PERFORMING CROSS-MODAL INFORMATION RETRIEVAL USING A NEURAL NETWORK USING LEARNED RANK IMAGES

(71) Applicant: Naver Corporation, Seongnam-si (KR)

(72) Inventors: Jean-Michel Renders, Quaix en Chartreuse (FR); Stephane Clinchant, Grenoble (FR); Thibault Formal, Landaul (FR)

(73) Assignee: Naver Corporation

( * ) Notice: Subject to any disclaimer, the term of this patent is extended or adjusted under 35 U.S.C. 154(b) by 171 days.

(21) Appl. No.: 17/170,393

(22) Filed: Feb. 8, 2021

(65) Prior Publication Data
US 2021/0349954 A1    Nov. 11, 2021

(30) Foreign Application Priority Data
Apr. 14, 2020    (EP) .................. 20315159

(51) Int. Cl.
*G06F 16/00*    (2019.01)
*G06F 16/953*    (2019.01)
(Continued)

(52) U.S. Cl.
CPC ........ *G06F 16/953* (2019.01); *G06F 16/9024* (2019.01); *G06N 3/084* (2013.01)

(58) Field of Classification Search
CPC .... G06F 16/953; G06F 16/9024; G06F 16/55; G06F 16/583; G06F 16/65; G06F 16/683;
(Continued)

(56) References Cited

U.S. PATENT DOCUMENTS

2009/0292685 A1* 11/2009 Liu .......... G06F 16/73
707/999.005
2013/0080426 A1* 3/2013 Chen ......... G06F 16/58
707/723
(Continued)

FOREIGN PATENT DOCUMENTS

CN    106777402 A  *  5/2017  ............ G06F 16/33

OTHER PUBLICATIONS

European Search Report Published on Nov. 26, 2020 for European Patent Application No. EP20305582.7, filed on Jun. 3, 2020 dated Nov. 26, 2020.
(Continued)

*Primary Examiner* — Syed H Hasan

(57) ABSTRACT

A system and method perform cross-modal information retrieval, by generating a graph representing the set of media objects. Each node of the graph corresponds to a media object and is labeled with a set of features corresponding to a text part of the respective media object. Each edge between two nodes represents a similarity between a media part of the two nodes. A first relevance score is computed for each media object of the set of media objects that corresponds to a text-based score. A second relevance score is computed for each media object by inputting the graph into a graph neural network. The first relevance score and the second relevance score are combined to obtain a final ranking score for each media object.

52 Claims, 7 Drawing Sheets

(51) Int. Cl.
 *G06F 16/901* (2019.01)
 *G06N 3/08* (2006.01)
(58) Field of Classification Search
 CPC ....... G06F 16/783; G06F 16/75; G06N 3/084;
  G06N 3/0481; G06N 5/022; G06N
  3/0427; G06N 3/0454
 See application file for complete search history.

(56) References Cited

U.S. PATENT DOCUMENTS

2017/0330068 A1* 11/2017 Yu ........................ G06V 10/806
2018/0108124 A1* 4/2018 Guo ................. G06V 30/19173

OTHER PUBLICATIONS

Chen, Wanyu; Cai, Fei; Chen, Honghui; De Rijke, Maarten; "Joint Neural Collaborative Filtering for Recommender Systems," ACM Transactions on Infomration Systems 1,1 (Jul. 2019) Jul. 2019.
Shen, Wei-Yuan; Lin, Hsuan-Tien; "Active Sampling of Pairs and Points for Large-scale Linear Bipartitie Ranking," arvix.org, Cornell Unversity, 201 Olin Library Cornell University, Ithaca, NY 14853 Aug. 24, 2017 Aug. 2017.
Co-pending U.S. Appl. No. 17/215,323, filed Mar. 29, 2021 2021.
Ah-Pine, J M, C M Cifarelli, S M Clinchant, G M Csurka, and J M Renders. 'XRCE's Participation to ImageCLEF 2008'. In 9th Workshop of the Cross-Language Evaluation Forum (CLEF 2008). Aarhus, Denmark, 2008, https://hal.archives-ouvertes.fr/hal-01504444. 2008.
Ah-Pine, Julien, Gabriela Csurka, and Stéphane Clinchant. 'Unsupervised Visual and Textual Information Fusion in CBMIR Using Graph-Based Methods'. ACM Transactions on Information Systems 33, No. 2 (Feb. 26, 2015): 1-31. https://dol.org/10.1145/2699668. Feb. 26, 2015.
Ai, Qingyao, Keping Bi, Jiafeng Guo, and W. Bruce Croft. 'Learning a Deep Listwise Context Model for Ranking Refinement'. The 41st International ACM SIGIR Conference on Research & Development in Information Retrieval, Jun. 27, 2018, 135-44. https://doi.org/10.1145/3209978.3209985. Jun. 27, 2018.
Andrew, Galen, Raman Arora, Jeff Bilmes, and Karen Livescu. 'Deep Canonical Correlation Analysis', n.d., 9. 2019.
Bruch, Sebastian, Masrour Zoghi, Michael Bendersky, and Marc Najork. 'Revisiting Approximate Metric Optimization in the Age of Deep Neural Networks', In Proceedings of the 42nd International ACM SIGIR Conference an Research and Development in Information Retrieval, 1241-44. Paris France: ACM, 2019. https://doi.org/10.1145/3331184.3331347. 2019.
Burges, Christopher J C. 'From RankNet to LambdaRank to LambdaMART: An Overview', n.d., 19. 2019.
Carvalho, Micael, Rémi Cadène, David Picard, Laure Soulier. Nicolas Thome, and Matthieu Cord. 'Cross-Modal Retrieval in the Cooking Context: Learning Semantic Text-Image Embeddings'. ArXiv:1804.11146 [Cs], Apr. 30, 2018. http://arxiv.org/abs/1804.11146. Apr. 30, 2018.
Chen, Kan. Trung Bui. Fang Chen, Zhaowen Wang, and Ram Nevatia. 'AMC: Attention Guided Multi-Modal Correlation Learning for Image Search'. ArXiv:1704.00763 [Cs], Apr. 3, 2017. http://arxiv.org/abs/1704.00763. Apr. 3, 2017.
Clinchant, Stephane, Jean-Michel Renders, and Gabriela Csurka. 'Trans-Media Pseudo-Relevance Feedback Methods in Multimedia Retrieval', In Advances in Multilingual and Multimodal Information Retrieval, edited by Carol Peters, Valentin Jijkoun, Thomas Mandi, Henning Müller, Douglas W. Oard, Anselmo Peñas, Vivien Petras, and Diana Santos, 5152:569-76. Lecture Notes in Computer Science, Berlin, Heidelberg: Springer Berlin Heidelberg, 2008. https://doi.org/10.1007/978-3-540-85760-0_71. 2008.
Csurka, Gabriela, Julien Ah-Pine, and Stephane Clinchant. 'Unsupervised Visual and Textual Information Fusion in Multimedia Retrieval—A Graph-Based Point of View'. ArXiv:1401.6891 [Cs], Jan. 27, 2014. http://arxiv.org/abs/1401.6891. Jan. 27, 2014.
Dai, Zhuyun, Chenyan Xiong, Jamie Callan, and Zhiyuan Liu. 'Convolutional Neural Networks for Soft-Matching N-Grams in Ad-Hoc Search'. In Proceedings of the Eleventh ACM International Conference on Web Search and Data Mining, 126-34. Marina Del Rey CA USA: ACM, 2018. https://doi.org/10.1145/3159652.3159659. 2018.
Fan, Yixing, Jiafeng Guo, Yanyan Lan, Jun Xu, Chengxiang Zhai, and Xueqi Cheng. 'Modeling Diverse Relevance Patterns in Ad-Hoc Retrieval'. The 41st International ACM SIGIR Conference on Research & Development in Information Retrieval, Jun. 27, 2018, 375-84. https://doi.org/10.1145/3209978.3209980. Jun. 27, 2018.
Fey, Matthias, and Jan E Lenssen. 'Fast Graph Representation Learning With Pytorch Geometric', Sep. 2019, 2019.
Frome, Andrea, Greg S Corrado, Jonathon Shlens, Samy Bengio, Jeffrey Dean, Marc'Aurelio Ranzato, and Tomas Mikolov. 'DeViSE: A Deep Visual-Semantic Embedding Model', n.d., Nov. 2019.
Gilmer, Justin, Samuel S. Schoenholz, Patrick F. Riley, Oriol Vinyals, and George E. Dahl. 'Neural Message Passing for Quantum Chemistry'. ArXiv:1704.01212 [Cs], Jun. 12, 2017. http://arxiv.org/abs/1704.01212. Jun. 12, 2017.
Gong, Yunchao, Qifa Ke, Michael Isard, and Svetlana Lazebnik. 'A Muiti-View Embedding Space for Modeling Internet Images, Tags, and Their Semantics'. International Journal of Computer Vision 106, No. 2 (Jan. 2014): 210-33. https://doi.org/10.1007/s11263-013-0658-4. Jan. 2014.
Gong, Yunchao, Liwei Wang, Micah Hodash, Julia Hockenmaier, and Svetlana Lazebnik. 'Improving Image-Sentence Embeddings Using Largs Weakly Annotated Photo Collections'. In Computer Vision—ECCV 2014, edited by David Fleet, Tomas Pajdla, Bernt Schiele, and Tinne Tuytelaars, 8692:529-45. Lecture Notes in Computer Science. Cham: Springer International Publishing, 2014. https://doi.org/10.1007/978-3-319-10593-2_35. 2014.
Gordo, Albert, and Diane Larlus. 'Beyond Instance-Level Image Retrieval: Leveraging Captions to Learn a Globa Visual Representation for Semantic Retrieval'. In 2017 IEEE Conference on Computer Vision and Pattern Recognition (CVPR), 5272-81. Honolulu, HI: IEEE, 2017, https://doi.org/10.1109/CVPR.2017.560. 2017.
Guo, Jiafeng, Yixing Fan, Qingyao Ai, and W. Bruce Croft. 'A Deep Relevance Matching Model for Ad-Hoc Retrieval', Proceedings of the 25th ACM International on Conference on Information and Knowledge Management, Oct. 24, 2016, 55-64. https://doi.org/10.1145/2983323.2983769. 2016.
Hamilton, William L., Rex Ying, and Jure Leskovec. 'Inductive Representation Learning on Large Graphs'. ArXiv:1706.02216 [Cs, Stat], Sep. 10, 2018. http://arxiv.org/abs/1706.02216. 2018.
He, Kaiming, Xiangyu Zhang, Shaoqing Ren, and Jian Sun. 'Deep Residual Learning for Image Recognition'. ArXiv:1512.03385 [Cs], Dec. 10, 2015. http://arxiv.org/abs/1512.03385. 2015.
Hu, Peng, Liangli Zhen, Dezheng Peng, and Pei Liu. 'Scalable Deep Multimodal Learning for Cross-Modal Retrieval', In Proceedings of the 42nd International ACM SIGIR Conference on Research and Development in Information Retrieval, 635-44. Paris France: ACM, 2019. https://doi.org/10.1145/3331184.3331213. 2019.
Hua, Xian-Sheng, Linjun Yang, Jingdong Wang, Jing Wang, Ming Ye, Kuansan Wang, Yong Rui, and Jin Li. 'Clickage: Towards Bridging Semantic and Intent Gaps via Mining Click Logs of Search Engines'. In Proceedings of the 21st ACM International Conference on Multimedia, 243-52. MM '13. New York, NY, USA: Association for Computing Machinery, 2013. https://doi.org/10.1145/2502081.2502283, 2013.
Huang, Po-Sen, Xiaodong He, Jianfeng Gao, Li Deng, Alex Acero, and Larry Heck. 'Learning Deep Structured Semantic Models for Web Search Using Clickthrough Data'. In Proceedings of the 22nd ACM International Conference on Conference on information & Knowledge Management—CIKM '13, 2333-36. San Francisco, California, USA: ACM Press, 2013. https://doi.org/10.1145/2505515.2505665. 2013.
Hui, Kai, Andrew Yates, Klaus Berberich, and Gerard de Melo, 'Co-PACRR: A Context-Aware Neural IR Model for Ad-Hoc Retrieval'. ArXiv:1706.10192 [Cs], Jun. 30, 2017. http://arxiv.org/abs/1706.10192. 2017.

(56) References Cited

OTHER PUBLICATIONS

Hui, Kai, Andrew Yates, Klaus Berberich, and Gerard de Melo. 'PACRR: A Position-Aware Neural IR Model for Relevance Matching'. ArXiv:1704.03940 [Cs], Apr. 12, 2017. http://arxiv.org/abs/1704.03940. 2017.
Kan, Meina, Shiguang Shan, and Xilin Chen. 'Multi-View Deep Network for Cross-View Classification'. In 2016 IEEE Conference on Computer Vision and Pattern Recognition (CVPR), 4847-55, Las Vegas, NV, USA: IEEE, 2016. https://doi.org/10.1109/CVPR.2016.524. 2016.
Khasanova, Renata, Xiaowen Dong, and Pascal Frossard. 'Multi-Modal Image Retrieval with Random Walk on Multi-Layer Graphs'. In 2016 IEEE International Symposium on Multimedia (ISM), 1-6. San Jose, CA. USA: IEEE, 2016, https://doi.org/10.1109/ISM.2016.0011. 2016.
Kingma, Diederik P., and Jimmy Ba. 'Adam: A Method for Stochastic Optimization'. ArXiv:1412.6980 [Cs], Dec. 22, 2014. http://arxiv.org/abs/1412.6980. 2014.
Kipf, Thomas N., and Max Welling. 'Semi-Supervised Classification with Graph Convolutionai Networks'. ArXiv:1609.02907 [Cs, Stat], Sep. 9, 2016. http://arxiv.org/abs/1609.02907. 2016.
Lavrenko, Victor, and W. Bruce Croft, 'Relevance Based language Models'. In Proceedings of the 24th Annual International ACM SIGIR Conference on Research and Development in Information Retrieval, 120-27. SIGIR '01. New York, NY, USA: Association for Computing Machinery, 2001. https://doi.org/10.1145/383952.383972. 2001.
Li, Canjia, Yingfei Sun, Ben He, Le Wang, Kai Hui, Andrew Yates, Le Sun, and Jungang Xu. 'NPRF: A Neural Pseudo Relevance Feedback Framework for Ad-Hoc Information Retrieval'. ArXiv:1810.12936 [Cs], Oct. 30, 2018. http://arxiv.org/abs/1810.12936. 2018.
Li, Qimai, Zhichao Han, and Xiao-Ming Wu. 'Deeper Insights into Graph Convolutional Networks for Semi-Supervised Learning'. ArXiv:1801.07606 [Cs, Stat], Jan. 22, 2018. http://arxiv.org/abs/1801.07606. 2018.
Lin, Tsung-Yi, Michael Maire, Serge Belongie, Lubomir Bourdev, Ross Girshick, James Hays, Pietro Perona, Deva Ramanan, C. Lawrence Zitnick, and Piotr Dollár. 'Microsoft, COCO: Common Objects in Context'. ArXiv:1405.0312 [Cs], May 1, 2014. http://arxiv.org/abs/1405.0312. 2014.
Liong, Venice Erin, Jiwen Lu, Yap-Peng Tan, and Jie Zhou, 'Deep Coupled Metric Learning for Cross-Modal Matching', IEEE Transactions on Multimedia 19, No. 6 (Jun. 2017): 1234-44. https:/./doi.org/10.1109/TMM.2016.2646180. 2017.
Liu, Shichen, Fei Xiao, Wenwu Ou, and Luo Si. 'Cascade Ranking for Operational E-Commerce Search', In Proceedings of the 23rd ACM SIGKDD International Conference on Knowledge Discovery and Data Mining, 1557-65, Halifax NS Canada: ACM, 2017. https://doi.arg/10.1145/3097983.3098011, 2017.
Mitra, Bhaskar, and Nick Craswell. 'An Updated Duet Model for Passage Re-Ranking'. ArXiv:1903.07666 [Cs], Mar. 18, 2019. http://arxiv.org/abs/1903.07666. 2019.
Mitra, Bhaskar, Fernando Diaz, and Nick Craswell. 'Learning to Match Using Local and Distributed Representations of Text for Web Search'. ArXiv: 1610.08136 [Cs], Oct. 25, 2016. http://arxiv.org/abs/1610.08136, 2016.
Mitra, Bhaskar, Eric Nalisnick, Nick Craswell, and Rich Caruana. 'A Dual Embedding Space Model for Document Ranking'. ArXiv:1602.01137 [Cs], Feb. 2, 2016. http://arxiv.org/aba/1602.01137. 2016.
Nogueira, Rodrigo, and Kyunghyun Cho. 'Task-Oriented Query Reformulation with Reinforcement Learning', ArXiv:1704.04572 [Cs], Sep. 24, 2017. http://arxiv.org/abs/1704.04572. 2017.
Pang, Liang, Yanyan Lan, Jiafeng Guo, Jun Xu, Jingfang Xu, and Xueqi Cheng. 'DeepRank: A New Deep Architecture for Relevance Ranking in Information Retrieval'. Proceedings of the 2017 ACM on Conference on Information and Knowledge Management, Nov. 6, 2017, 257-66. https://doi.org/10.1145/3132847.3132914. 2017.
Pei, Changhua, Yi Zhang, Yongfeng Zhang, Fei Sun, Xiao Lin, Hanxiao Sun, Jian Wu, Peng Jiang, and Wenwu Ou. 'Personalized Re-Ranking for Recommendation', ArXiv:1904.06813 [Cs], Apr. 14, 2019. http://arxiv.org/abs/1904.06813. 2019.
Plummer, Bryan A., Liwei Wang, Chris M. Cervantes, Juan C. Caicedo, Julia Hockenmaier, and Svetlana Lazebnik. 'Flickr30k Entities: Collecting Region-to-Phrase Correspondences for Richer Image-to-Sentence Models'. ArXiv:1505.04870 [Cs], May 19, 2015. http://arxiv.org/abs/1505.04870. 2015.
Qi, Jinwei, and Yuxin Peng. 'Cross-Modal Bidirectional Translation via Reinforcement Learning', In Proceedings of the Twenty-Seventh International Joint Conference on Artificial Intefligence, 2630-36. Stockholm, Sweden: International Joint Conferences on Artificial intelligence Organization, 2018. https://doi.org/10.24963/ijcai.2018/365. 2018.
Renders, Jean-Michel, and Gabriela Csurka. 'NLE @ MediaEval'17: Combining Cross-Media Similarity and Embeddings for Retrieving Diverse Social Images', n.d., Mar. 2019.
Rendle, Steffen, Christoph Freudenthaler, Zeno Gantner, and Lars Schmidt-Thieme. 'BPR: Bayesian Personalized Ranking from Implicit Feedback', 2009, Oct. 2009.
Srivastava, Nitish, Geoffrey Hinton, Alex Krizhevsky, Ilya Sutskever, and Ruslan Salakhutdinov, 'Dropout: A Simple Way to Prevent Neural Networks from Overfitting', n.d,, 30. 2019.
Szegedy, Christian, Sergey Ioffe, Vincent Vanhoucke, and Alex Alemi. 'Inception-v4, Inception-ResNet and the Impact of Residual Connections on Learning', ArXiv:160.07261 [Cs], Feb. 23, 2016. http://arxiv.org/abs/1602.07261. 2016.
Vaswani, Ashish, Noam Shazeer, Niki Parmar, Jakob Uszkoreit, Liion Jones, Aidan N. Gomez, Lukasz Kaiser, and Illia Polosukhin. 'Attention is all you Need'. ArXiv:1706.03762 [Cs], Jun. 12, 2017. http://arxiv.org/abs/1706.03762. 2017.
Velic'kovic. Petar, Guillem Cucurull, Arantxa Casanova. Adriana Romero, Pietro Lio, and Yoshua Bengio. 'Graph Attention Networks'. 2018. Dec. 2018.
Wang, Bokun, Yang Yang, Xing Xu, Alan Hanjalic, and Hang Tao Shen. 'Adversarial Cross-Moda Retrieval'. In Proceedings of the 25th ACM International Conference on Multimedia, 154-62, Mountain View California USA: ACM. 2017. https://doi.org/10.1145/3123266.3123326. 2017.
Wang, Liwei, Yin Li, Jing Huang, and Svetlana Lazebnik. 'Learning Two-Branch Neural Networks for Image-Text Matching Tasks', IEEE Transactions on Pattern Analysis and Machine Intelligence 41, No. 2 (Feb. 1, 2019): 394-407, https://doi.org/10.1109/TPAMI.2018.2797921. 2019.
Wang, Liwei, Yin Li, and Svetlana Lazebnik. 'Learning Deep Structure-Preserving Image-Text Embeddings'. In 2016 IEEE Conference on Computer Vision and Pattern Recognition (CVPR), 5005-13 Las Vegas, NV, USA: IEEE, 2016. https://doi.org/10.1109/CVPR.2016.541, 2016.
Weston, Jason, Samy Bengio, and Nicolas Usunier. 'WABIE: Scaling Up to Large Vocabulary Image Annotation', n. d . Jul. 2019.
Wu, Yiling, Shuhui Wang, and Qingming Huang, 'Learning Semantic Structure-Preserved Embeddings for Cross-Modal Retrieval'. In Proceedings of the 26th ACM International Conference on Multimedia, 825-33. Seoul Republic of Korea: ACM, 2018. https://doi.org/10.114513240508.3240521. 2018.
Xiong, Chenyan, Zhuyun Dai, Jamie Callan, Zhiyuan Liu, and Russell Power. 'End-to-End Neural Ad-Hoc Ranking with Kernel Pooling'. Proceedings of the 40th International ACM SIGIR Conference on Research and Development in Information Retrieval, Aug. 7, 2017, 55-64, https://doi.org/10.1145/3077136.3080809. 2017.
Xu, Keyulu, Weihua Hu, Jure Leskovec, and Stefanie Jegelka. 'How Powerful Are Graph Neural Networks?' ArXiv:1810.00826 [Cs, Stat], Feb. 22, 2019. http://arxiv.org/abs/1810.00826. 2019.
Yan, Fei, and Krystian Mikolajczyk, 'Deep Correlation for Matching Images and Text'. In 2015 IEEE Conference on Computer Vision and Pattern Recognition (CVPR), 3441-50. Boston, MA, USA: IEEE, 2015. https://doi.org/10.1109/CVPR.2015.7298966, 2015.
Ying, Rex, Ruining He, Kaifeng Chen, Pong Eksombatchai, William L. Hamilton, and Jure Leskovec. 'Graph Convolutional Neural Networks for Web-Scale Recommender Systems'. Proceedings of the 24th ACM SIGKDD International Conference on Knowledge Discovery & Data Mining, Jul. 19, 2018, 974-83. https://doi.org/10.1145/3219819.3219890. 2018.

(56) References Cited

OTHER PUBLICATIONS

Zhai, Chengxiang, and John Lafferty. 'A Study of Smoothing Methods for Language Models Applied to Ad Hoc Information Retrieval', n. d., Sep. 2019.

Zhang, Ying, and Huchuan Lu. 'Deep Cross-Modal Projection Learning for Image-Text Matching'. In Computer Vision—ECCV 2018, edited by Vittorio Ferrari, Martial Hebert, Cristian Sminchisescu, and Yair Weiss, 11205:707-23. Lecture Notes in Computer Science. Cham: Springer International Publishing, 2018. https://doi.org/10.1007/978-3-030-01246-5_42. 2018.

Zhu, Lin, Yihong Chen, and Bowen He. 'A Domain Generalization Perspective on Listwise Context Modeling'. ArXiv:1902.04484 [Cs], Feb. 12, 2019. http://arxiv.org/abs/1902.04484. 2019.

European Search Report for European Patent Application No. EP 20315159.2, filed on Apr. 14, 2020 Aug. 20, 2020.

Formal. Thibault et al., "Learning to Rank Images with Cross-modal Graph Convolutions," Springer Nature Switzerland AG, J.M. Jose et al. (Eds.): ECIR 2020, LNCS 12035, pp. 589-604, 2020, link.springer.com/chapter/10.1007/978-3-030-454 39-5_39 2020.

Ding, Jingtao, Guanghui Yu, Xiangnan He, Yong Li, and Depeng Jin. 'Sampler Design for Bayesian Personalized Ranking by Leveraging View Data'. ArXiv:1809.08162 [Cs], Sep. 21, 2018 2018.

He, Xiangnan, Jinhui Tang, Xiaoyu Du, Richang Hong, Tongwei Ren, and Tat-Seng Chua. 'Fast Matrix Factorization with Non-Uniform Weights on Missing Data'. ArXiv:1811.04411 [Cs, Stat], Jan. 7, 2019. 2019.

Ioffe, Sergey, and Christian Szegedy. 'Batch Normalization: Accelerating Deep Network Training by Reducing Internal Covariate Shift'. ArXiv:1502.03167 [Cs], Feb. 10, 2015. 2015.

Kingma, Diederik P., and Jimmy Ba. 'Adam: A Method for Stochastic Optimization'. ArXiv:1412.6980 [Cs], Dec. 22, 2014. 2014.

Lei, Yu, Wenjie Li, Ziyu Lu, and Miao Zhao. 'Alternating Pointwise-Pairwise Learning for Personalized Item Ranking'. In Proceedings of the 2017 ACM on Conference on Information and Knowledge Management, 2155-58. Singapore Singapore: ACM, 2017. 2017.

Liu, Tie-Yan. Learning to Rank for Information Retrieval. Berlin, Heidelberg: Springer Berlin Heidelberg, 2011. 2011.

Pan, Rong, Yunhong Zhou, Bin Cao, Nathan N. Liu, Rajan Lukose, Martin Scholz, and Qiang Yang. 'One-Class Collaborative Filtering'. In 2008 Eighth IEEE International Conference on Data Mining, 502-11. Pisa, Italy: IEEE, 2008. 2008.

Park E.L., Cho, S.: "KoNLPy: Korean natural language processing in Python", Proceedings of the 26th Annual Conference on Human & Cognitive Language Technology, Chuncheon, Korea, Oct. 2014 2014.

Rendle, Steffen, and Christoph Freudenthaler. 'Improving Pairwise Learning for Item Recommendation from Implicit Feedback'. In Proceedings of the 7th ACM International Conference on Web Search and Data Mining, 273-82. New York New York USA: ACM, 2014. 2014.

Rendle, Steffen, Christoph Freudenthaler, Zeno Gantner, and Lars Schmidt-Thieme. 'BPR: Bayesian Personalized Ranking from Implicit Feedback'. In Proceedings of the Twenty-Fifth Conference on Uncertainty in Artificial Intelligence, 452-61. UAI '09. Arlington, Virginia, USA: AUAI Press, 2009. 2009.

Revaud, Jerome, Jon Almazan, Rafael Sampaio de Rezende, and Cesar Roberto de Souza. 'Learning with Average Precision: Training Image Retrieval with a Listwise Loss'. ArXiv:1906.07589 [Cs], Jun. 18, 2019. 2019.

Verberne, Suzan, Hans van Halteren, Daphne Theijssen, Stephan Raaijmakers, and Lou Boves. 'Learning to Rank for Why-Question Answering'. Information Retrieval 14, Apr. 2011 2011.

Wang, Yilin, Suhang Wang, Jiliang Tang, Huan Liu, and Baoxin Li. 'PPP: Joint Pointwise and Painvise Image Label Prediction'. In 2016 IEEE Conference on Computer Vision and Pattern Recognition (CVPR), 6005-13. Las Vegas, NV, USA: IEEE, 2016 2016.

Wu, Ga, Maksims Volkovs, Chee Loong Soon, Scott Sanner, and Himanshu Rai. 'Noise Contrastive Estimation for One-Class Collaborative Filtering'. In Proceedings of the 42nd International ACM SIGiR Conference on Research and Development in Information Retrieval, 135-44. Paris France: ACM, 2019 2019.

Xue, Hong-Jian, Xinyu Dai, Jianbing Zhang, Shujian Huang, and Jiajun Chen. 'Deep Matrix Factorization Models for Recommender Systems'. In Proceedings of the Twenty-Sixth International Joint Conference on Artificial Intelligence, 3203-9. Melbourne, Australia: International Joint Conferences on Artificial Intelligence Organization, 2017 2017.

Eunjeong L. Park, Sungzoon Cho. "KoNLPy: Korean natural language processing in Python", Proceedings of the 26th Annual Conference on Human & Cognitive Language Technology, Chuncheon, Korea, Oct. 2014 (available on the Internet at lucypark.kr/docs/2014-10-10-hclt.pdf). 2014.

Cinar, Yagmur Gizem, and Renders, Jean-Michel. "Adaptive Pointwise-Pairwise Learning-to-Rank for Content-based Personalized Recommendation," ReeSys '20: Fourteenth ACM Conference on Recommender Systems, Sep. 2020, pp. 414-419. https://doi.org/10.1145/3383313.3412229 2020.

Co-pending U.S. Appl. No. 17/215,984, filed Mar. 29, 2021 2021.

\* cited by examiner

TABLE 1

|  |  | # params | P@20 | nDCG@20 | nDCG | MAP |
|---|---|---|---|---|---|---|
| MediaEval'17 | LTR |  | 0.758 | 0.767 | 0.912 | 0.707 |
|  | CM [11] |  | 0.843 | 0.857 | 0.939 | 0.784 |
|  | LTR + CM |  | 0.852 | 0.868 | 0.942 | 0.789 |
|  | DCMM-cos | 268 | 0.871 | 0.876 | 0.944 | 0.803 |
|  | DCMM-edge | 3314 | 0.861 | 0.871 | 0.944 | 0.806* |
| WebQ | LTR |  | 0.69 | 0.801 | 0.884 | 0.775 |
|  | CM [11] |  | 0.724 | 0.84 | 0.901 | 0.815 |
|  | LTR + CM |  | 0.724 | 0.839 | 0.901 | 0.813 |
|  | DCMM-cos | 1868 | 0.729 | 0.847 | 0.905 | 0.821 |
|  | DCMM-edge | 15522 | 0.738* | 0.857* | 0.91* | 0.83* |

FIGURE 7

TABLE 2

|  | P@5 | P@20 | nDCG@5 | nDCG@20 | mAP |
|---|---|---|---|---|---|
| Cross-modal | 0.886 | 0.845 | 0.891 | 0.857 | 0.781 |
| Approach Described Herein | 0.895 | 0.868 | 0.895 | 0.876 | 0.802 |

FIGURE 8

SYSTEM AND METHOD FOR PERFORMING CROSS-MODAL INFORMATION RETRIEVAL USING A NEURAL NETWORK USING LEARNED RANK IMAGES

PRIORITY INFORMATION

Pursuant to 35 U.S.C.§ 119 (a), this application claims the benefit of earlier filing date and right of priority to European Patent Application Number EP 20315159.2, filed on Apr. 14, 2020, The entire content of European Patent Application Number EP 20315159.2, filed on Apr. 14, 2020 is hereby incorporated by reference.

BACKGROUND

When a user enters a search query into a web search engine, a list of ranked results comprising documents relevant to the query is returned. Beyond textual search, different types of content are often integrated in the search results, such as images, videos, or audio, in order to cover different user needs. This is known as cross-modal retrieval, where the goal is to retrieve relevant objects that are of a different nature to the query. For example, a query of one content type (e.g., text) is used to retrieve search results in another content type (e.g., images).

However, directly including non-textual features in the search ranking process is not straightforward due to the semantic gap between different content types (e.g., between text and images). This is why the problem of cross-modal retrieval has initially been addressed using standard text-based indexing and retrieval by considering only the textual content of multi-modal objects.

However, building a universal training collection of paired (image, text) instances, where the text describes faithfully the content of the image in terms of elementary objects and their relationships, is too expensive and time-consuming in practice. Consequently, image search engines rely on such pairs crawled from the Web, where the link between image and text (e.g., image caption, surrounding sentences, etc.) is tenuous and noisy.

To circumvent this problem, query logs have been conventionally used but real queries are never expressed in the same way as the ones considered when evaluating joint embedding methods. In practice, queries are characterized by very large intent gaps, as queries do not accurately describe the content of the image but contain only a few words, and are far from expressing the true visual needs.

Another conventional approach is disclosed in Published US Patent Application Number 2009/0292685. Published US Patent Application Number 2009/0292685 discloses a video search re-ranking via multi-graph propagation technique employing multimodal fusion in video search is presented, employing not only textual and visual features, but also semantic and conceptual similarity between video shots to rank or re-rank the search results received in response to a text-based search query.

However, the multi graph propagation approach in Published US Patent Application Number 2009/0292685 fails to learn the final ranking of the model. Moreover, the multi graph propagation approach in Published US Patent Application Number 2009/0292685 fails to learn the representation or features of objects and fails to modulate the influence of nodes and edges automatically for the function to be optimized.

To improve the quality of the search results, some conventional techniques aim to exploit visual information in the ranking process. Specifically, two main lines of work can be distinguished regarding cross-modal retrieval. The first approach focuses on designing effective cross-modal similarity measures, while the second approach seeks to learn how to map images and text into a shared latent space.

The first approach combines different mono-media similarity signals, relying either on simple aggregation rules, or on unsupervised cross-modal pseudo-relevance feedback mechanisms, that depend on the choice of a few but critical hyper-parameters. The unsupervised cross-modal pseudo-relevance feedback mechanism is formulated as a two-step pseudo-relevance feedback propagation process in a graph, where nodes represent multi-modal objects and edges encode their visual similarities.

An example of the first approach, which uses cross-modal similarity measures, builds similarity measures by fusing mono-modal similarities, using either simple combination rules or more complex propagation mechanisms in similarity graphs (e.g., J. M. Ah-Pine et al., "XRCE's Participation to ImageCLEF 2008," $9^{th}$ *Workshop of the Cross-Language Evaluation Forum*, CLEF 2008; S. Clinchant et al., "Advances in multilingual and multimodal information retrieval," *Trans-Media Pseudo-Relevance feedback Methods in Multimedia Retrieval*, pp. 569-576, 2008).

However, the first approach lacks strong theoretical foundations, is sensitive to label noise (which is often the case with implicit feedback such as clicks), is unable to model complex relevance/click patterns, and is unsupervised (i.e., the first approach does not learn from data). The latter characteristic (unsupervised) lacks some dynamic behavior, such as being able to adapt to different queries.

In other words, cross-modal pseudo-relevance feedback methods have the advantage of being simple, but rely on a model with few parameters that cannot capture many different search scenarios.

The second approach emerged from the computer vision community, where text and images are embedded in the same latent space (i.e., joint embedding), allowing to directly match text queries to images (e.g., A. Frome et al., "DeViSE: A deep visual semantic embedding model," 2013; Y. Gong et al., "Improving image-sentence embeddings using large weakly annotated photo collections," 2014; A. Gordo et al., "Beyond instance-level image retrieval: Leveraging captions to learn a global visual representation for semantic retrieval," 2017; J. Weston et al., "Scaling up to large vocabulary image annotation").

Joint embedding techniques aim at learning a mapping between textual and visual representations. Canonical Correlation Analysis and its deep variants, as well as bi-directional ranking losses (or triplet losses) ensure that, in the new latent space, an image and corresponding text are correlated or close enough with respect to the other images and pieces of text in the training collection. Other objective functions utilize metric learning losses, machine translation-based measures, or even adversarial losses.

For example, a conventional joint textual and visual embedding model, (Wang, Liwei, Yin Li, and Svetlana Lazebnik, 'Learning Deep Structure-Preserving Image-Text Embeddings,' In 2016 *IEEE Conference on Computer Vision and Pattern Recognition (CVPR)*, 5005-13, Las Vegas, Nev., USA: IEEE, 2016.), uses a two-view neural network with two layers of non-linearities on top of any representation of the image and text views. To train this network, in a way which is reminiscent of some "learning to rank" strategies, four different triplet losses (visual-visual, textual-textual, visual-textual, and textual-visual) are used. The aim is to enforce that two documents relevant to the same query should have both textual and visual embeddings close in the new common (i.e., joint) latent space, while a document relevant to a query q should be far from documents non-relevant to the same query or from documents relevant to other queries.

However, the second approaches are generally evaluated on artificial retrieval scenarios and are rarely considered in a re-ranking scenario, where mechanisms like pseudo-relevance feedback are highly effective.

Overall, these two approaches suffer from several limitations: the approaches are sensitive to the triplet sampling strategy as well as the choice of appropriate margins in the ranking losses. Moreover, constituting a training set that ensures good learning and generalization is not an easy task: the text associated to an image should describe its visual content (e.g. "a man speaking in front of a camera in a park"), and nothing else (e.g. "the President of the US, the 10th of March", "John Doe", "joy and happiness").

Moreover, neural networks, such as RankNet and LambdaRank, have been intensively used in image retrieval to address the learning to rank task. While standard strategies focus on learning a global ranking function that considers each query-document pair in isolation, the strategies tend to ignore the difference in distribution in the feature space for different queries Graph Neural Networks (GNNs) are extensions of neural networks that deal with structured data encoded as a graph (e.g., T. N. Kipf et al., "Semi-supervised classification with graph convolutional networks," http://arxiv.org/abs/1609.02907, 2016).

On the other hand, Graph Convolutional Networks (GCNs) have been proposed for classifying nodes in a graph in a semi-supervised setting, i.e., when labels are only available for a subset of nodes. Each layer of a graph convolutional network can generally be decomposed as follows: (i) node features are first transformed (e.g., linear mapping), (ii) node features are convolved, meaning that for each node, a differentiable, permutation-invariant operation (e.g., sum, mean, or max) of its neighboring node features is computed, before applying some non-linearity, (iii) finally, a new representation for each node in the graph is obtained, which is then fed to the next layer.

Although graph convolutional networks are standard feed-forward networks, graph convolutional networks differ from such standard feed-forward networks, which process elements independently from each other, by processing all the nodes (or a subset) of the graph simultaneously. Therefore, graph convolutional networks introduce implicitly some dependencies among the predictions for nodes.

Accordingly, it is desirable to provide a process of cross-modal information retrieval without relying on a model with few parameters that cannot capture many different search scenarios.

Moreover, it is desirable to provide a process of cross-modal information retrieval that is not sensitive to label noise.

Furthermore, it is desirable to provide a process of cross-modal information retrieval that is able to model complex relevance/click patterns.

Also, it is desirable to provide a process of cross-modal information retrieval that is able to adapt to different queries.

Additionally, it is desirable to provide a process of cross-modal information retrieval without introducing dependencies among the predictions for nodes.

BRIEF DESCRIPTION OF THE DRAWINGS

The drawings are only for purposes of illustrating various embodiments and are not to be construed as limiting, wherein:

FIG. 7 illustrates Table 1 showing comparison of methods on datasets; and

FIG. 8 illustrates Table 2 showing comparison of methods on MediaEval datasets.

DETAILED DESCRIPTION OF THE DRAWING

Figure 1:
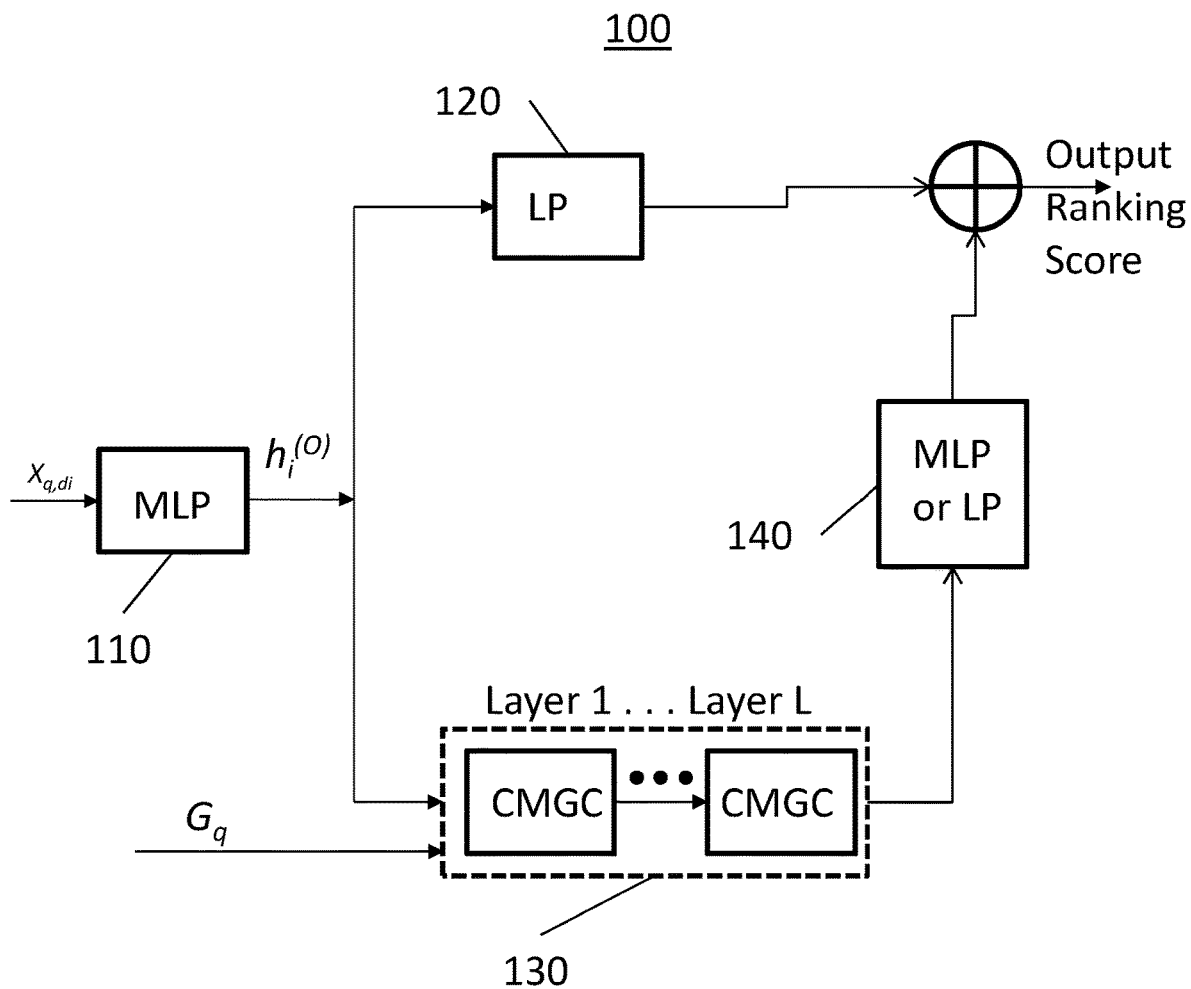
FIG. 1 illustrates a block diagram of a differentiable cross-modal model (DCMM) neural network architecture.

The systems and methods, described below, perform cross-modal information retrieval using a neural network. For purposes of explanation, numerous examples and specific details are set forth in order to provide a thorough understanding of the described embodiments.

The illustrative embodiments will be described with reference to the drawings wherein like elements and structures are indicated by like reference numbers. Further, where an embodiment is a method, the steps and elements of the method may be combinable in parallel or sequential execution.

A user enters a search query into a user interface to retrieve the most relevant content with respect to the search query. The content may be retrieved from a database collection of content items, or more generally, from the web. The system returns one or more of image content, video content, and audio content relevant to the query.

The returned content includes individual content items ranked in order of relevance to the user's search query. For example, a user may enter a text query and obtain the most relevant images with respect to the text query (i.e., the standard use-case in a web image search).

In an embodiment, each content item forms part of a media object. A media object is a logical collection of data composed of a media part and a text part. The media part comprises the content item (i.e., the image content item, the video content item, or the audio content item). The media objects may be extracted from multimedia documents; for example, web pages or HTML files, which the media objects are embedded therein. The multimedia documents may each comprise one or more content items of the same or different content types as well as text content.

The text part may be obtained from the text content of the multimedia document in any suitable manner; for example, the text may be crawled from a web page hosting the media part. In other words, the text part may be the text that is normally used by a search engine to index the media object. In an embodiment, the text part comprises at least one of an image title and one or more tags associated with the image.

A standard (e.g., mono-modal, text-based) ranking algorithm, following any standard multi-stage ranking architecture used in search engines, is used to obtain a set of media objects that are potentially relevant to the search query. The set of media objects may also be referred to as a set of candidate media objects. The standard ranking algorithm computes an initial ranking for the set of media objects. The initial ranking indicates the relevance of each of the media objects to the search query according to the first ranking algorithm.

For example, the top 100 or the top 1000 images most relevant to a search query may be retrieved by a pure text ranker. Thus, the set of media objects may be a subset of the media objects in the media object collection. Alternatively, the set of media may be all of the media objects in the media object collection.

The set of candidate media objects is then re-ranked using supervised neural network techniques, described in detail below, and the re-ranked set of media objects is displayed to the user; for example, the re-ranked set of media objects is displayed in a list.

FIG. 1 illustrates a differentiable cross-modal model neural network 100 that facilitates the retrieval of the most relevant media objects with respect to a search query in accordance with an embodiment. Differentiable cross-modal model neural network 100 comprises an encoder layer 110, a linear projection layer (LP) 120, a graph neural network 130 and a ranking output layer 140.

It is noted that the encoder layer 110 may be a multi-layer perceptron (MLP), optionally with ReLU activations. It is further noted that the ranking output layer 140 may be a multi-layer perceptron (MLP) or a linear projection layer (LP).

As discussed above, in response to a search query, at least one standard ranking algorithm is used to obtain a set of media objects relevant to the search query. The standard ranking algorithm may be a supervised or an unsupervised ranking model.

It is noted that the standard ranking algorithm may include one of the following: a PageRank algorithm, a term frequency-inverse document frequency algorithm, tf-idf, a bag-of-words retrieval algorithm such as BM25, a Dirichlet smoothed language model, or a dual embedding space model for document ranking.

Each media object of the set of media objects is weakly labeled with a set of features $x_{q,d_i}$ corresponding to the text part of the respective media object. The set of features $x_{q,d_i}$ may comprise features associated with the standard ranking algorithm.

For example, any features used or generated by the standard ranking algorithm may be used as a weak supervision signal. Thus, the set of features $x_{q,d_i}$ may comprise at least one learning-to-rank feature generated by the standard ranking algorithm.

It is noted that by computing an initial ranking for the set of media objects, the standard ranking algorithm may generate a rank/score for each of the media objects in the set of media objects. This rank/score of each media object is an initial relevance score between the search query input by the user and each media object's text part that acts as a feature of the set of features $x_{q,d_i}$.

Alternatively, it is noted that the set of features $x_{q,d_i}$ may comprise features independent from the standard ranking algorithm, such as PageRank score, a feature related to media object freshness, a feature related to media object popularity, media object source (e.g., the data collection), features related to the query, etc.

Moreover, the set of features $x_{q,d_i}$ may include one or more of term frequency, inverse document frequency, term frequency-inverse document frequency (tf-idf), document length, BM25 score, Dirichlet smoothed language model score, LMIR.ABS, LMIR.DIR, LMIR.JM, PageRank score, Inlink number, Outlink number, number of slash in URL, length of URL, and/or number of child pages.

Furthermore, clicks may additionally or alternatively be used as weak relevance signals. Here, the standard ranking algorithm performs the initial ranking of the set of media objects, which is then outputted (e.g., displayed) to the user. The user then clicks on the displayed media objects. It can be assumed that a click on a media object indicates that the user deems the media object to be relevant to the search query. Thus, clicks may be recorded and the recorded click data debiased due to position on the display. The click data can then be transformed into a score or pseudo-labels that can be used as features of the set of features.

The set of features $x_{q,d_i}$ are input into the encoder layer 110. Encoder layer 110 is configured to generate an encoder representation of the set of features. The encoder representation of the set of features is then inputted into each of the linear projection layer 120 and the graph neural network 130. Thus, encoder layer 110 encodes the features $x_{q,d_i}$ to obtain initial node features $h_i^0$.

In one embodiment, the encoder layer 110 may be a multi-layer perceptron (.; θ) with ReLU activations.

As illustrated in FIG. 1, the differentiable cross-modal model neural network 100 splits into two branches. The first branch comprises the linear projection layer 120. Linear projection layer 120 is configured to receive the encoder representation of the set of features and to output a first relevance score $s_T(q,d_i)$ for each media object of the set of media objects. In other words, the linear projection layer 120 is configured to project linearly each $h_i^{(O)}$ to a real-valued score (the first relevance score) $s_T(q,d_i)=w_0^T h_i^{(O)}$.

The first relevance score is a text-based score because the first relevance score based on the set of features (i.e., the text part) of the media objects. In addition to improving the accuracy of the output of the differentiable cross-modal model neural network 100, the presence of the first branch as a separate branch focusing on learning to rank images solely from input nodes (i.e., from the features $x_{q,d_i}$) actually stabilizes the training, due to the shared input transformation.

The second branch comprises the graph neural network 130 and the ranking output layer 140. As will be described below, the graph neural network 130 may be any standard graph neural network or a graph convolutional network.

It is noted that the graph neural network 130 may comprise one or more layers, or the graph neural network 130 may comprise a single cross-modal graph convolution layer. Alternatively, the graph neural network 130 may comprise a plurality of cross-modal graph convolution layers (CMGC) (Layer 1 to Layer L).

The graph neural network 130 is configured to receive, as input, the encoder representation of the set of features (i.e., the node features $h_i^0$ output by the encoder layer 110) and a graph $G_q$, associated with the search query and representing the set of media objects obtained using the standard ranking algorithm. Specifically, each layer of the graph neural network 130 is configured to receive, as input, the graph $G_q$.

Each node of the graph $G_q$ corresponds to a media object of the set of media objects, where each node is labeled with the set of features $x_{q,d_i}$. In other words, each node is labeled with features related to the text part of the respective media object and/or generic features that depend on the query and the respective media object itself (i.e., metadata related to the respective media object).

Each edge between two nodes of the graph represents a similarity between the respective media parts of the two nodes (e.g., the visual similarity or the audio similarity between the two nodes).

More specifically, each search query $q \in Q$ is associated with a graph $G_q$, defined as follows.

The set of nodes of the graph is the set of candidate media objects $d_i$ to be re-ranked for the search query (typically from a few to hundreds of media objects, depending on the query).

Each node i of the set of nodes is described by the set of (n) features $x_{q,d_i} \in \mathbb{R}^n$, as discussed above.

$v_i \in \mathbb{R}^d$ denotes a (normalized) embedding of the media part of media object $d_i$. Any suitable deep learning model may be used to extract the features of the media part of the respective media object to generate the embedding $v_i$.

It is noted that when the media part comprises image content, a ResNet architecture may be used to generate the embeddings.

There are two options for the graph structure: (1) edges given by a k-nearest neighbor graph, based on a similarity between the embeddings $v_i$, or (2) it is assumed that all nodes are implicitly connected to each other (i.e., the special case for the k-nearest neighbor graph, where $k=|G_q|-1$).

$\mathcal{N}_i$ denotes the neighborhood of node i; i.e., the set of nodes j such that there exists an edge from j to i.

Edge weights are considered. Each edge between two nodes is associated with an edge weight given by a similarity function between the embeddings $v_i$ for a given object type of the two nodes $f_{ij}=g(v_i,v_j)$. The edge weights make it possible to "modulate" the message passing process. Advantageously, the differentiable cross-modal model neural network is adapted to dynamically change the graph by adjusting the weights of edges between nodes by modulating the influence of nodes and edges automatically from the function to be optimized. For instance, if an edge is constructed in the graph but the model estimate it is somewhat irrelevant, the edge weight could be assigned a very small value, thereby ignoring the connection.

Thus, the graph enables the media part (i.e., the non-textual content) of the media objects to be used in the re-ranking performed by the differentiable cross-modal model neural network.

The goal is to learn how to propagate features in the above graph.

Generalizing convolutional operations to graphs can generally be expressed as a message passing scheme as follows:

$$h_i^{(l+1)} = \gamma(h_i^{(l)}, AGG(\phi(h_i^{(l)}, h_j^{(l)}, f_{ij})_{j \in \mathcal{N}_i}))$$

where $\gamma$ and $\phi$ denote differentiable functions; e.g., multilayer perceptrons; and AGG is an aggregation such as sum or pooling operator, such as MAX.

Several graph neural networks considers edge weights $f_{ij}$ to be function of variables $h_i^{(l)}$, $h_j^{(l)}$.

In contrast, the differentiable cross-modal model neural network of FIG. 1 considers edge weight as function of embedding $f_{ij}=g(v_i,v_j)$ (eventually augmented by the additional use of $h_i^{(l)}$, $h_j^{(l)}$ if needed).

By choosing $\gamma(x,y)=ReLU(y)$, $\phi(h_i^{(l)},h_j^{(l)}),g(v_i,v_j))= W^{(l)}h_k^{(l)}g(v_i,v_j)$ and $$AGG = \sum \phi(h_i^{(l)},h_j^{(l)},f_{ij}),$$

the one or more layers of the graph neural network 130 are defined as:

$$h_i^{(l+1)} = ReLU(\sum W^{(l)}h_j^{(l)}g(v_i, v_j))$$

For the edge function, g, the cosine similarity $g_{cos}(v_i,v_j)=\cos(v_i,v_j)$ is considered, defining a first model, referred to as differentiable cross-modal model-cos (DCMM-cos), and a simple learned similarity measure parameterized by a vector a such that $g_{edge}(v_i,v_j)=v_i^T \text{diag}(a)v_j$, defining a second model, referred to as differentiable cross-modal model-edge (DCMM-edge).

Other graph convolutional networks can be extended to include cross-modal convolutions. For instance, the GraphSage architecture (W. L. Hamilton et al., "Inductive Representation Learning on Large Graphs", 31$^{st}$ *Conference on Neural Information Processing Systems* (NIPS 2017), https://cs.stanford.edu/people/jure/pubs/graphsage-nips17.pdf, 2017) can be extended such as:

$$h_i^{(l+1)} = ReLU(U^l Concat(h_i^l, Mean_{j \in \mathcal{N}_i}(W^l h_j^l g_{(edge)(v_i,v_j)})))$$

where $U^l \in \mathbb{R}^{(d,2d)}$ with d being the node dimensionality and U a reprojection matrix.

Similarly, the Graph Attention Network (GAT) (P. Veličković et al., "Graph Attention Networks," https://arxiv.org/abs/1710.10903, ICLR, 2018) can be extended to include cross-modal convolutions. Instead of applying the attention mechanism on the node features, one can use the embedding $v_i$ to compute attention weights on the nodes. Formally, with the notations of the papers in Graph Attention Network, edge weights are defined by:

$$e_{(i,j)}=a(W h_i^l, W h_j^l)$$

In some embodiments, the cross modal graph attention network can be defined by:

$$e_{(i,j)} = a(Wv_i, Wv_j) \text{ or } e_{(i,j)} = g\_(\cos)(v_i, v_j) \text{ or } e(i,j) = g_{edge}(v_i, v_j) = v_i^T \text{diag}(a)v_j$$

Furthermore, the Gated Graph ConvNet (GatedGCN) (see V. P. Dwivedi et al., "Benchmarking Graph Neural Networks," https://arxiv.org/pdf/2003.00982.pdf, 2020, in particular equations 22, 23 and 24 in the Appendix) can be defined with a cross-modal convolution. By following the convention of V. P. Dwivedi et al., equation 23 could be rewritten as:

$$e_{(i,j)}^l = \frac{\sigma(e_{i,j}^l + \beta \bar{g}_{edge}(v_l,v_j))}{\sum_{j \in \mathcal{N}_i} \sigma(e_{i,j}^l + \beta g_{edge}(v_l,v_j))}$$

to include cross modal graph convolutions.

Based on similar principles, the MONET and GIN architectures (see V. P. Dwivedi et al., "Benchmarking Graph Neural Networks," https://arxiv.org/pdf/2003.00982.pdf, 2020) can trivially be extended to incorporate $g_{edge}(v_i,v_j)$ into the edge weight components.

It is noted that the graph may be inputted directly into the graph neural network 130. In other embodiments, the graph may first be encoded and the encoded representation of the graph is inputted into the graph neural network 130.

For example, with reference to the techniques developed by J. Klicpera et al. ("Diffusion Improves Graph Learning," 33$^{rd}$ *Conference on Neural Information Processing Systems* (NeurIPS 2019), https://arxiv.org/pdf/1911.05485.pdf, 2019) different powers of the adjacency matrix A may be combined into a new graph defined by $A_{new}$=A+ f(A*A)+ . . . where f would prune edges with a low weight.

Based on the input, the graph neural network 130 is configured to compute, for each media object of the set of media objects, a final node embedding for each node of the graph. The final node embedding takes into account the whole context of the graph through the message passing implemented by the graph neural network 130.

The graph neural network 130 is configured to output the final node embedding for each node of the graph. The final node embedding is inputted into the ranking output layer 140. After the convolution(s), a final embedding for each node $h_i^{(L)}$ is outputted by the final layer of the graph neural network 130.

The ranking output layer 140 is configured to receive the final node embedding as input and to output the second relevance score for each object. It is noted that the ranking output layer 140 may project the final embedding for each node $h_i^{(L)}$ to a real-valued score $s_{conv}(q,d_i)$, using either a linear projection layer ($s_{conv}(q,d_i)=w_L^T h_i^L$) or a multi-layer perceptron ($s_{conv}(q,d_i)=MLP(h_i^{(L)},\omega)$).

Finally, the two scores (the first relevance score and the second relevance score) are combined to obtain a final ranking score that corresponds to a relevance of a respective media object to the search query:

$$(q,d_i)=w_0^T h_i^{(0)}+s_{conv}(q,d_i)$$

It is noted that where the graph neural network 130 comprises a plurality of layers, a stack of all intermediate representations $[h_i^{(0)} \| h_i^{(1)} \| \ldots \| h_i^{(L)}]$ may be used by the ranking output layer 140 to compute the final ranking score, instead of the final node embedding $h_i^{(L)}$ output by the final layer.

The differentiable cross-modal model neural network 100 is trained using backpropagation and any standard learning to rank loss: pointwise, pairwise, or listwise. It is noted that a pairwise BPR loss (S. Rendl et al., "BPR: Bayesian personalized ranking from implicit feedback," *Proceedings of the Twenty-Fifth Conference on Uncertainty in Artificial Intelligence*, pp. 452-461, 2009) may be used.

Considering a graph (i.e., the set of candidate media objects for query q) in the batch, and all feasible pairs of media objects $D_q^{+,-}$ for this query (feasible meaning all the pairs that can be made from positive and negative examples in the graph). Then, the loss is defined as:

$$\mathcal{L}(\theta, w_0, \gamma_{conv}, \omega) = - \sum_{d^+, d^- \in D_q^{+,-}} \log \sigma(s(q, d^+) - s(q, d^-))$$

where $\theta, w_0, \gamma_{conv}, \omega$ represent the parameters of the encoder layer 110, the linear projection layer 120, the graph neural network 130, and the ranking output layer 140, respectively.

Alternatively, AttRank loss (Q. Ai et al., "Learning a deep listwise context model for ranking refinement," http://arxiv.org/abs/1804.05936, 2018) or ApproxNDCG loss (S. Bruch et al., "Revisiting approximate metric optimization in the age of deep neural networks," *Proceedings of the 42$^{nd}$ International ACM SIGIR Conference on Research and Development in Information Retrieval, SIGIR '19*, pp. 1241-1244, 2019) may be used.

Figure 2:
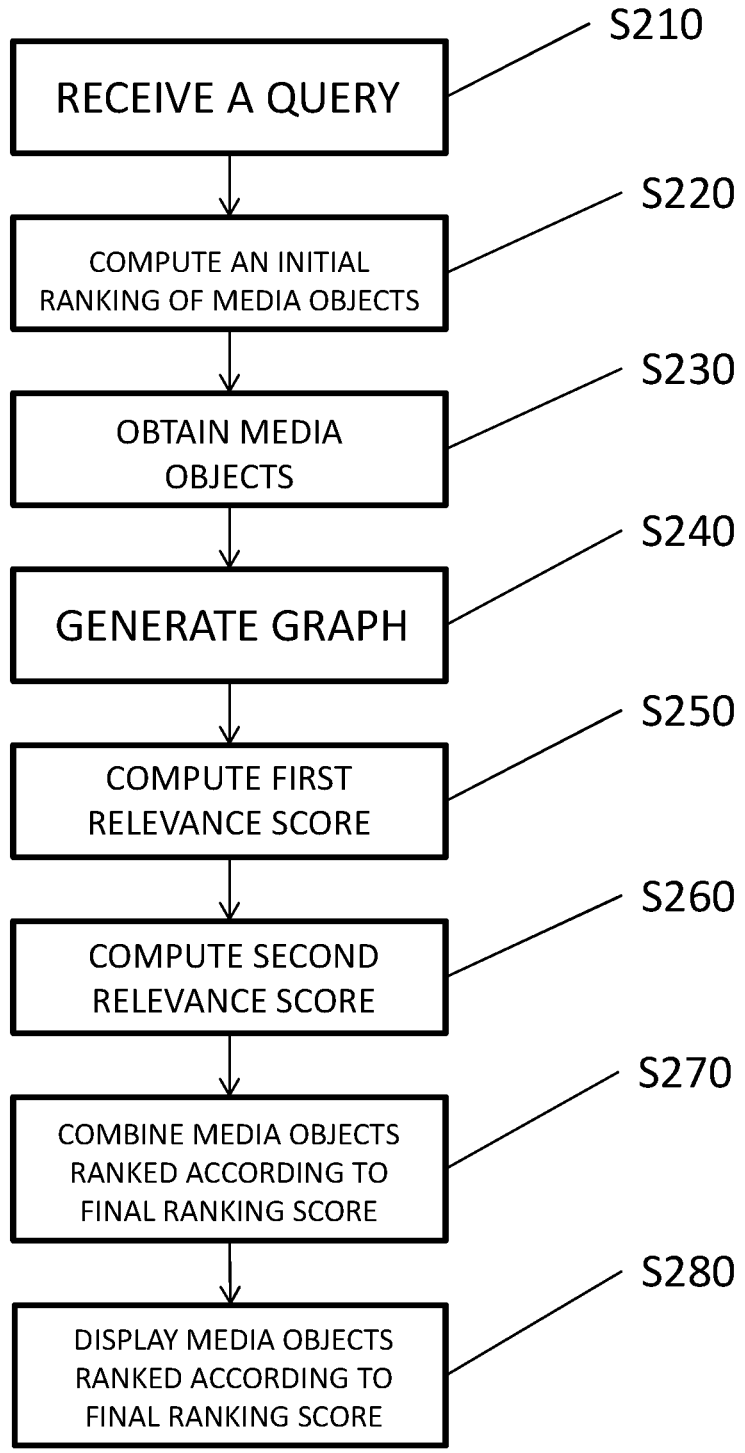
FIG. 2 illustrates a process flow diagram for performing cross-modal retrieval using the differentiable cross-modal model neural network.

FIG. 2 illustrates a process flow diagram of an exemplary method performing cross-modal retrieval using the differentiable cross-modal model neural network of FIG. 1.

At step S210, a search query is received from a user via a user interface. For example, the user enters text into the user interface; i.e., the search query is a text query.

The search query is inputted into a standard ranking algorithm. Any standard ranking algorithm may be used, such as those used by commercial search engines.

In response to the search query, at step S220, an initial ranking for a set of media objects is computed using the standard ranking algorithm; i.e., the standard ranking algorithm ranks the collection of media objects in order of relevance to the search query using the text part of the media objects.

It is noted that a standard ranking algorithm may be used to compute the initial ranking, or a plurality of standard ranking algorithms may be used to compute the initial ranking.

The standard ranking algorithm may output a subset of media objects from a media object collection, ranked in order of their relevance with respect to the search query. Alternatively, the standard ranking algorithm may output all media objects from the media object collection, ranked in order of their relevance with respect to the search query.

At step S230, a set of media objects is obtained in response to the search query. As discussed above in relation to FIG. 1, each media object of the set of media objects is weakly labeled with a set of features $x_{q,d_i}$. The set of features $x_{q,d_i}$ are associated with the text parts of the media objects. The set of features may comprise features associated with the standard ranking algorithm. The set of features $x_{q,d_i}$ may comprise one learning to rank features generated by the standard ranking algorithm. Alternatively, the set of features $x_{q,d_i}$ may comprise features independent from the standard ranking algorithm.

At step S240, the graph $G_q$, discussed in relation to FIG. 1 above, is generated. Here, each node of the graph corresponds to a media object of the set of media objects. Each node is labeled with the set of features $x_{q,d_i}$. Specifically, each node is labeled with features related to the text part of the respective media object and/or metadata related to the respective media object itself.

Each edge between two nodes of the graph represents a similarity between the respective media parts of the two nodes (e.g., the visual similarity or the audio similarity between the two nodes). Each edge between two nodes may be weighted based on the similarity between the media parts of its respective two nodes.

As discussed above with respect to FIG. 1, an encoder representation of the set of features $x_{q,d_i}$ is computed by an encoder layer 110.

The encoder layer 110 may be a multi-layer perceptron, optionally with ReLU activations. The encoder representation of the set of features $x_{q,d_i}$ is inputted into each of a linear projection layer 120 and a graph neural network 130.

At step S250, a first relevance score for each media object of the set of media objects is computed. Specifically, the linear projection layer 120 computes, based on the input encoder representation, the first relevance score for each media object of the set of media objects. The first relevance score is a text-based score (i.e., a score based on the text part) that corresponds to the relevance of the respective media object to the search query.

At step S260, a second relevance score is computed for each media object of the set of media objects by inputting the graph into the graph neural network 130. Specifically, in addition to receiving the encoder representation of the set of features, the graph neural network 130 receives the generated graph $G_q$.

As discussed above in relation to FIG. 1, the graph neural network 130 may be any standard graph neural network or graph convolutional network.

The graph may be inputted directly into each layer of the graph neural network 130, or the graph may be first encoded and an encoder representation of the graph is inputted into each layer of the graph neural network 130.

At step S260, the graph neural network 130 computes a final node embedding based on the input.

The graph neural network 130 may comprise a single cross-modal graph convolution layer or a plurality of cross-modal graph convolution layers.

The graph neural network 130 outputs the final node embedding to a ranking output layer 140, where the ranking output layer 140 may be a multi-layer perceptron or a linear projection layer. The ranking output layer 140 computes the second relevance score by projecting the final node embedding to a real-value score.

At step S270, the first relevance score and the second relevance score are combined to obtain a final ranking score for each media object.

At step S280, the media objects are displayed to the user via the user interface. The media objects may be displayed in a list ranked according to the final ranking score.

The embodiments, described in relation to FIGS. 1 and 2, are listwise by design: an example in a batch is not a single image in isolation, but all the candidate images for a given query, encoded as a graph, that are re-ranked together in a one shot manner.

This is in contrast to a model that has been trained using a listwise loss function but uses a pointwise scoring function, where the score depends only on the document itself.

Contrary to conventional listwise context modeling, the embodiments of FIGS. 1 and 2 consider a set of media objects to re-rank, and not a sequence.

More specifically, the rank information of the first (standard) ranking algorithm is discarded in the re-ranking process. Moreover, in the case of implicit feedback (clicks used as weak relevance signals), using rank information raises the issue of biased learning to rank (sensitivity to position and trust biases).

Further, contrary to conventional graph convolution models where edges between nodes generally indicate a certain relationship between nodes (for instance, connection between two users in a social network), the graph structure, described in the embodiments herein, edges between nodes generally indicate a certain relationship between nodes representing a similarity between two nodes.

Two datasets were used to validate the approach described in the embodiments of FIGS. 1 and 2: a public dataset from a MediaEval challenge (http://www.multimediaeval.org/mediaeval2019), and an annotated set of queries sampled from image search logs of Naver, the biggest commercial search engine in Korea:

Experiments (MediaEval) were first conducted on the dataset from the "MediaEval17, Retrieving Diverse Social Images Task" challenge (http://www.multimediaeval.org/mediaeval2017/diverseimages). While this challenge also had a focus on diversity aspects, the standard relevance ranking task is was the focus of consideration.

The dataset was composed of a ranked list of images (up to 300) for each query, retrieved from Flickr using its default ranking algorithm. The queries were general-purpose queries (e.g., q=autumn color), and each image had been annotated by expert annotators (binary label, i.e., relevant or not).

The goal was to refine the results from the base (i.e., the initial) ranking obtained from Flickr's default ranking algorithm. The training set contains 110 queries for 33340 images, while the test set contains 84 queries for 24986 images.

While any number of features can be used as input for the model (typically from hundreds to thousands in commercial search engines), a very narrow set of weak relevance signals was used in the experiments, in order to remain comparable to conventional cross-modal approaches (i.e., to ensure that the gain does not come from the addition of richer features).

Four relevance scores between the query and each image's text component were used as node features: term frequency-inverse document frequency (tf-idf), BM25, Dirichlet smoothed language model and dual embedding space model (DESM) score. An Inception-ResNet model of dimension d=1536, pre-trained on ImageNet, was used to get the image embeddings.

In order to validate the approach described above on a real world dataset (WebQ), a set of 1000 queries was sampled from the image search logs of Naver over a period of two weeks. The sample included head (frequent), torso (medium frequency), and tail (rare) queries. All images appearing in the top-50 candidates for these queries within a period of time of two weeks were labeled by three annotators in terms of relevance to the query (binary label). Due to different query characteristics (in terms of frequency, difficulty etc.) and given the fact that new images are continuously added to/removed from the index, the number of images per query in the sample were variable (from around ten to a few hundred).

It is noted that, while there was access to a much larger amount of click logs, the experiments were restricted to this small sample in order keep the evaluations simple. The goal here was to show that pseudo-relevance feedback mechanisms can be learned and reproduced, without relying on large amount of data.

Moreover, in this setting, it was easier to understand model's behavior, as click noise and position bias were avoided.

After removing queries without relevant images (according to majority voting among the three annotators), the sample included 952 queries, and 43064 images, indexed through various text fields (e.g., title of the page, image caption etc.).

Seven of such fields that might contain relevant pieces of information were selected. Two simple relevance features were computed for the selected fields with respect to query q: BM25 and DESM (using embeddings trained on a large query corpus from an anterior period).

An additional feature was also added, which is a mixture of the two above, on the concatenation of all the fields. Image embeddings (d=2048) were obtained using a ResNet-152 model pre-trained on ImageNet.

Given the limited number of queries in both collections, a 5-fold cross-validation was conducted, by randomly splitting the queries into five folds. The model was trained on four folds (with one fold kept for validation, early stopping on normalized discounted cumulative gain (nDCG) is used), and evaluated on the remaining one; this procedure was repeated five times.

Then, the average validation nDCG was used to select the best model configuration. Note that for the MediaEval dataset, there was access to a separate test set, so the evaluation methodology was modified slightly: the above 5-fold cross-validation was performed on the training set, without using a validation fold (hence, early stopping was not used, and the number of epochs was a hyperparameter to tune).

Once the best model was selected with the above strategy, it was re-trained on the full training set, and the final performance was given on the test set. The nDCG (normalized discounted cumulative gain), mAP (mean average precision), P@20 (precision at rank 20), and nDCG@20 (normalized discounted cumulative gain at rank 20) was reported for both datasets.

The models were trained using stochastic gradient descent with the Adam optimizer. The batch size (i.e., number of graphs per batch) was set to bs={5}, {32} for respectively MediaEval and WebQ, so that training fitted on a single NVIDIA Tesla P100 GPU.

The hyper-parameters tuned for each dataset were: (1) the learning rate E {1e-3, 1e-4, 5e-5}, (2) the number of layers∈{2, 3} for the input of the multi-layer perceptron, as well as the number of hidden units∈{4, 8, 16, 32}, {8, 16, 32, 64}, (3) the dropout rate in the multi-layer perceptron layers∈{0, 0.2}, (4) the number of graph convolutions∈{I, 2, 3, 4} as well as the number of hidden units∈{4, 8, 16}, {8, 16, 32}, (5) the dropout rate of the convolution layers∈{0, 0.2, 0.5}, and (6) the number of visual neighbors to consider when building the input graph, ∈{1, 3, 5, 10, 20, 50, 80, 100, 120, |G|−1}, {1, 3, 5, 10, 15, 20, 30, |G|−1} for respectively MediaEval and WebQ.

For MediaEval, the number of epochs∈{50, 100, 200, 300, 500} was also tuned, while for WebQ, it was set to 500. Early stopping was used with patience (i.e., the number of epochs to wait before early stop if no progress on the validation set) set to 80. All node features were query-level normalized (mean-std normalization). The models were implemented using PyTorch and PyTorch geometric for the message passing components.

For both datasets, the differentiable cross-modal model neural network was compared to the following baselines: (1) a learning to rank model only based on textual features; (2) cross-modal similarity (CM) (G. Csurka, et al., "Unsupervised visual and textual information fusion in multimedia retrieval—a graph-based point of view," http://arxiv.org/abs/1401.6891, 2014); and (3) the above learning to rank model with cross-modal similarity as an additional input feature; to verify that it was actually beneficial to learn the cross-modal propagation in differentiable cross-modal model neural network in an end-to-end manner.

For the cross-modal similarity, a simple mixture of term-based relevance score (Dirichlet-smoothed LM and BM25 for respectively MediaEval and WebQ) and DESM score, on a concatenation of all text fields, was used as proxy for $s_T(q,.)$.

From the experiments, it was observed that it is actually beneficial to recombine the cross-modal similarity with the initial relevance $s_T(q,.)$, using a simple mixture. Hence, three parameters were tuned (the two mixture parameters, and the number of neighbors for the query), following the evaluation methodology introduced above.

The learning to rank models were standard multi-layer perceptrons: corresponding to the upper part of architecture first (text) branch of the neural network illustrated in FIG. 1, and were tuned following the same strategy.

The models were not compared with joint embedding approaches on those datasets for the reasons mentioned in above in the background section, but also due to initial experiments on MediEval which gave poor results.

For the sake of illustration, on MediaEval, 64% of the queries have no lemmas in common with training queries (and 35% for WebQ): given the relatively small size of these datasets, the models could not generalize to unseen queries. This illustrates an "extreme" example of the generalization issues (especially on tail queries) of joint embedding techniques.

In the meantime, as the model was fed with learning to rank features, especially term-based relevance scores like BM25, it was less sensitive to generalization issues, for instance on new-named entities.

However, both approaches are not antagonist, but can actually be complementary. As the model can be seen as an extension of listwise learning to rank for bi-modal objects (if edges are removed, the model reduces to a standard multi-layer perceptron-based learning to rank), it can take as input node features matching scores from joint embeddings models.

Table 1, as illustrated in FIG. 7, presents the main results of the experiments. Significant improvement with respect to the cross-modal similarity is indicated with an asterisk (*) (probability value, p-value <0.05). The number of trained parameters is indicated for the convolution models: ranging from few hundreds to few thousands; i.e., orders of magnitude less than joint embeddings models.

It is demonstrated that going from pure text ranker to a model using both media types improves the results by a large margin (all the models are significantly better than the text-based learning to rank model, these tests are not included in Table 1 for clarity).

Moreover, results indicate that combining initial features with the unsupervised cross-modal similarity in a learning to rank model allows slightly improved results over the latter (not significantly though) for the MediaEval dataset, while it has no effect on WebQ: due to the fact that features are somehow redundant in the setting, because of how $s_T(q,.)$ is computed for the cross-modal similarity; the same would not hold for a richer set of features for the learning to rank models.

Furthermore, the differentiable cross-modal model-cos outperforms all the baselines, with larger margins for MediaEval than for WebQ; the only significant result (p-value <0.05) is obtained for the MAP (Mean Average Precision) on MediaEval.

Table 1 shows that the above-described architecture (the most straightforward extension of cross-modal similarity, with a handful of parameters and trained on small datasets) is able to reproduce pseudo-relevance feedback mechanisms.

It is noted that results tend to drop as the number of layers is increased (best results are obtained with a single convolution layer), no matter the number of neighbors chosen to define the visual graph. While it might be related to the relative simplicity of the model, it actually echoes common observations in pseudo-relevance feedback models: if information is propagated too much, this tends to diffuse information too much. Similarly, a parallel can be made with over-smoothing in graph neural networks, which might be more critical for pseudo-relevance feedback, especially considering the simplicity of this model.

The differentiable cross-modal model-edge shows interesting results: on WebQ, results are improved significantly with respect to cross-modal similarity, while on MediaEval, results are slightly worse than differentiable cross-modal model-cos (except for the MAP).

It might be due to the fact that images in the latter are more alike to the ones used to train image signatures, compared to the (noisy) web images in WebQ; hence, learning a new metric between images has less impact For both datasets, best results are obtained with more than a single layer; it is hypothesized that the edge function plays the role of a simple filter for edges, allowing for propagation of information from useful nodes across more layers. Note that the number of layers needed for the task is tied to how the input graph is defined: the fewer neighbors considered for each node, the more layers might be needed, in order for each node to gather information from useful nodes.

Figure 3:
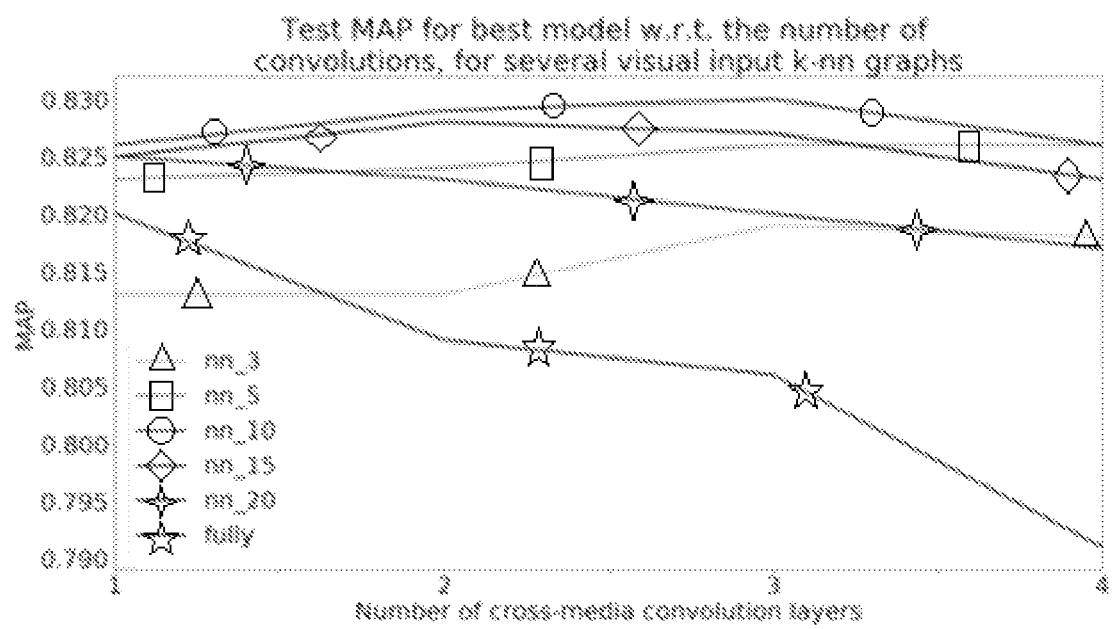
FIG. 3 is a plot showing the impact of the number of convolution layers and top-k neighbors for the WebQ dataset.

FIG. 3 shows that if the number of neighbors is too small (e.g. 3 or 5), the model needs more layers to improve performance. On the other hand, when considering too many neighbors (e.g., 20 or all), the nodes already have access to all the useful neighbors, hence adding layers only reduces performances. The right balance needs to be found between the number of neighbors and the number of convolution layers, so that the model can learn to propagate relevant signal (10 neighbors and 3 layers for WebQ).

An approach to cross-modal information retrieval in accordance with one embodiment, along with its experimental evaluation, has been described in detail above. Below, another approach to cross-media information retrieval, in accordance with another embodiment, will be described.

Figure 4:
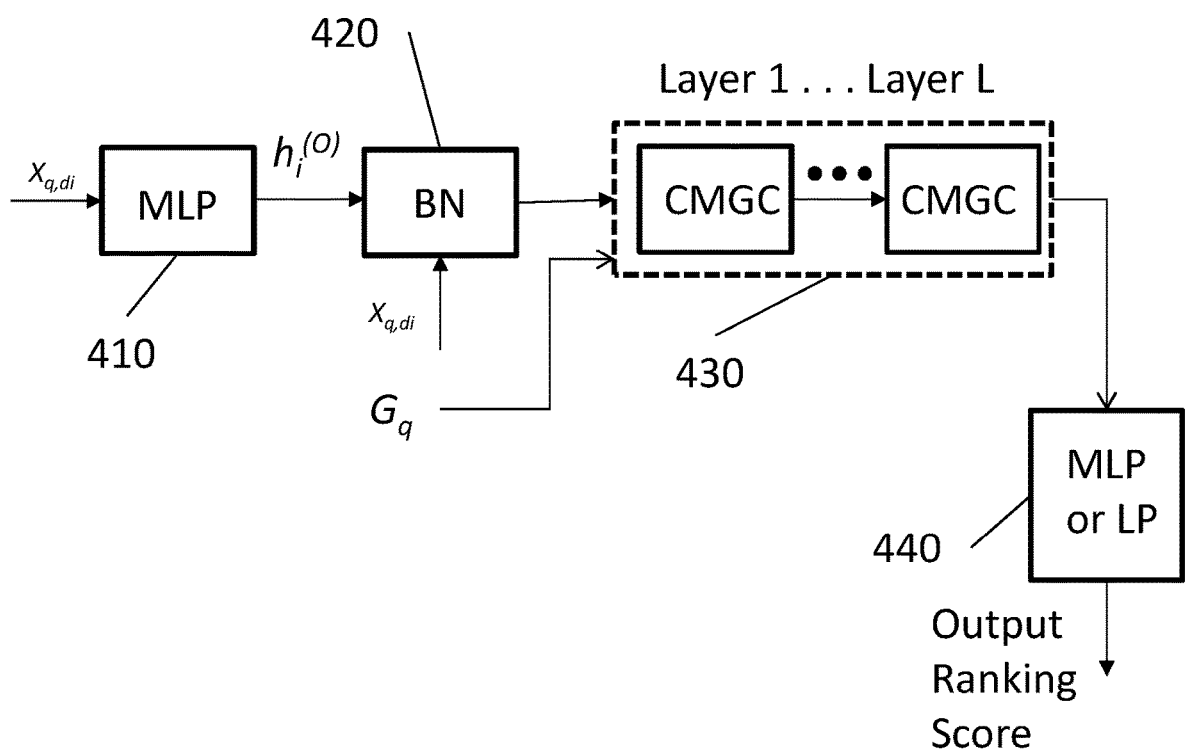
FIG. 4 illustrates a block diagram of a neural network architecture.

FIG. 4 illustrates a neural network architecture that facilitates cross-modal information retrieval in accordance with another embodiment. Neural network 400 comprises an encoder layer 410, a batch normalization layer 420, a graph neural network 430, and a ranking output layer 440. In some embodiments, the ranking output layer 440 may be a multi-layer perceptron (.; θ) or a linear projection layer.

Using the same techniques as discussed above with respect to FIGS. 1 and 2, a set of media objects relevant to a search query is obtained using a standard ranking algorithm. In the same manner as discussed above with respect to FIGS. 1 and 2, each media object of the set of media objects is weakly labeled with a set of features $x_{q,d_i}$. The set of features $x_{q,d_i}$ is normalized using any suitable normalization operator for the respective search query (e.g. Z-std, min-max, ||features||=1 etc.).

After the query level normalization of the features $x_{q,d_i}$, the features are inputted into the encoder layer 410. The encoder layer 410 is configured to encode the set of features $x_{q,d_i}$. The encoder 410 is a multi-layer perceptron with ReLU activations, in order to cope with the relatively small number of features, and take advantage of the expressive power of neural networks:

$$x''_{q,d_i} = MLP(x_{q,d_i}; \theta)$$

The encoder layer 410 outputs the encoder representation of the set of features, $x'_{q,d_i}$. Then, the original feature vector $x_{q,d_i}$ is concatenated with $x'_{q,d_i}$ to obtain feature vector $h_i^0 = [x_{q,d_i}||x'_{q,d_i}]$, representing the initial embedding for each node. Feature vector $h_i^0$ is then inputted into the batch normalization layer 420.

The graph neural network 430 is configured to receive, as input, the output of the batch normalization layer 410 and a graph, $G_q$ representing the set of documents obtained by the standard ranking algorithm for the query. It is noted that a query normalization layer may be used in place of the batch normalization layer 420.

The graph neural network 430 may be any standard graph neural network or a graph convolutional network. It is noted that the graph neural network 430 may comprise one or more layers. Alternatively, the graph neural network 430 may comprise a single cross-modal graph convolution layer or a plurality of cross-modal graph convolution layers. In the multiple cross-modal graph convolution layers embodiment, each cross-modal graph convolution layer of the graph neural network 430 is configured to receive, as input, the graph.

It is noted that the graph may be inputted directly into the graph neural network 430 or the graph may first be encoded and the encoded representation of the graph is input into the graph neural network 430.

Each node of the graph corresponds to a media object of the set of media objects. Each node is labeled with the set of features. Each edge between two nodes of the graph represents a similarity between the respective media parts of the two nodes (e.g., the visual similarity or the audio similarity between the two nodes).

More specifically, the graph $G_q$ is defined as follows: (1) the set of nodes of the graph is the set of candidate media objects $d_i$ to be re-ranked for the search query (typically from a few to hundreds of media objects, depending on the query); (2) each node i of the set of nodes of the graph is described by the set of (n) features $x_{q,d_i} \in \mathbb{R}^n$; and (3) $v_i$ denotes a (normalized) embedding of the media part (i.e., the visual part or the audio part) of media object $d_i$.

Any suitable deep learning model may be used to extract the features of the media part of the respective media object to generate the embedding $v_i$.

It is noted that when the media part comprises image content, the ResNet architecture may be used to generate the embeddings.

There are two options for the graph structure: (1) edges given by a k-nearest neighbor graph, based on a similarity between the embeddings $v_i$, or (2) it is assumed that all nodes are implicitly connected to each other (i.e. the special case for the k-nearest neighbor graph, where $k=|G_q|-1$). $\mathcal{N}_i$ denotes the neighborhood of node i, i.e., the set of nodes j such that there exists an edge from j to i.

Each edge may be described by an edge feature defined by the concatenation of the embeddings of its two extremity nodes, $f_{ij}=[v_i;v_j]$. These edge features make it possible to "modulate" the message passing process.

Contrary to most conventional graph convolution models where the edges between nodes generally indicate a certain relationship between nodes (for instance, connection between two users in a social network), the edges between nodes generally indicate, in the above described graph convolution model, a connection representing the distance between two nodes.

The goal is to learn how to propagate the set of features in the above graph. Generalizing convolution operations to graphs can generally be expressed as a message passing scheme:

$$h_i^{(l+1)} = \gamma\left(h_i^{(l)}, \sum_{j \in \mathcal{N}_i} \phi(h_j^{(l)}, f_{ij})\right)$$

where γ and φ denote non-linear differentiable functions such as multi-layer perceptrons, element-wise sigmoid or element-wise ReLu.

The following equation expresses that, to obtain the new representation of a node i at a layer (l+1), the current representation (at layer l) of node i is combined with an aggregation of the representations of its neighbor nodes, $\mathcal{N}_i$, transformed by a function φ, possibly taking into account the edge features between node i and its neighbors. This message passing formulation can be particularized by choosing $\phi(h_j^{(l)}, f_{ij}) = \tau_\theta(h_i^{(l)}) g_\beta(v_i, v_j)$:

$$h_i^{(l+1)} = \gamma\left(h_i^{(l)}, \sum_{j \in \mathcal{N}_i} \tau_\theta(h_j^{(l)}) g_\beta(v_i, v_j)\right)$$

The layers of the graph neural network 430 are then defined as follows:

$$h_i^{(l+1)} = ReLU\left(h_i^l + \sum_{j \in \mathcal{N}_i} z_j^{(l)} W^l h_j^{(l)} \langle v_i, v_j \rangle\right)$$

with $$z_j^{(l)} = \sigma(z)_j = \text{softmax}_j(a^{(l)T} W^{(l)} h_j^{(l)})$$

where the role of the $z_j$ is to filter out neighbors that should not be taken into account; i.e., features that should not be aggregated. Considering one layer of such model, basically the role of $z_j$ is to filter neighbors that have low weak relevance signals with respect to the query, mimicking the top-k operator in the cross-modal formulation. Note that $g_\beta(v_i, v_j)$ is restricted here to $\langle v_i, v_j \rangle$: while this limits the expressive power of the model, it also significantly reduces the number of parameters, allowing the training of the model on small benchmark datasets.

The graph neural network 430 is configured to output a final embedding for each node $h_i^{(L)}$. It is noted that instead of (or in addition to) cross-modal graph convolutions layers, parallel convolutions may be added at each layer.

The ranking output layer 440 is configured to receive the final embedding for each node $h_i^{(L)}$ as input and to output a real-value final ranking score for each node:

$$(q, d_i) = \text{MLP}(h_i^{(L)}, \omega)$$

It is noted that where the graph neural network 430 comprises a plurality of layers, a stack of all intermediate representations $[h_i^{(0)} \| h_i^{(1)} \| \ldots \| h_i^{(L)}]$ may be used by the ranking output layer 440 to compute the final ranking score, instead of the final node embedding $h_i^{(L)}$.

The model is trained using backpropagation and any standard learning to rank loss: pointwise, pairwise, or listwise. In an embodiment, pairwise BPR loss (S. Rendle et al., "BPR: Bayesian personalized ranking from implicit feedback," *Proceedings of the Twenty-Fifth Conference on Uncertainty in Artifical Intelligence*, pp. 452.461, 2009) is used. Considering a graph (i.e., the set of candidate media objects for query q) in the batch, and all feasible pairs of media objects $D_q^{+,-}$ for this query (feasible meaning all the pairs that can be made from positive and negative examples in the graph). Then, the loss is defined as:

$$\mathcal{L}(W, \theta, \omega) = - \sum_{d^+, d^- \in D_q^{+,-}} \log \sigma(s(q, d^+) - s(q, d^-))$$

where W, θ, ω represent the parameters of the graph neural network 430, the encoder layer 410, and the ranking output layer 440, respectively.

It is noted that the model may be trained using losses more closely related to ranking metrics, such as LamdaMART (C. J. Burges, "From ranknet to lambdarank to lambdamart: An overview," Tech. rep., https://www.microsoft.com/en-us/research/publication/from-ranknet-to-lambdarank-to-lamdamart-an-overview/, 2010) or Approx-NDCG (S. Bruch et al., "Revisiting approximate metric optimization in the age of deep neural networks," *Proceedings of the 42$^{nd}$ international ACM SIGIR Conference on Research and Development in Information Retrieval* (SIGIR '19), pp. 1241-1244, 2019).

Figure 5:
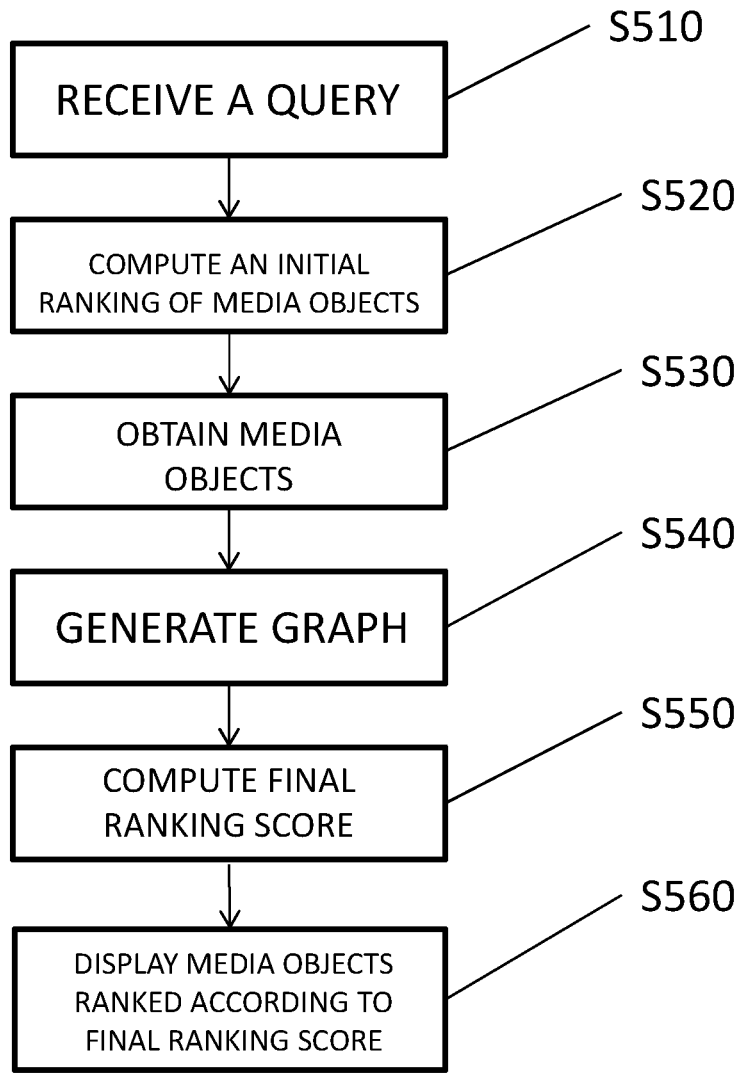
FIG. 5 illustrates a process flow diagram for performing cross-modal retrieval using a neural network.

FIG. 5 is a process flow diagram of an exemplary method performing cross-modal information retrieval (i.e., retrieving media objects in response to a search query) using the neural network of FIG. 4.

At step S510, a search query is received from a user via a user interface. In response to the search query, at step S520, an initial ranking for a set of media objects is computed using at least one standard ranking algorithm.

As discussed above, any suitable standard ranking algorithm may be used, such as those described with respect to FIGS. 1 and 2.

At step S530, a set of media objects is obtained in response to the search query. Each media object output by the standard ranking algorithm is associated with a set of features $x_{q,d_i}$. It is noted that at least one feature of the set of features $x_{q,d_i}$ may be obtained from the standard ranking algorithm.

Alternatively, the set of features $x_{q,d_i}$ may comprise features independent of the learning to rank algorithm, as discussed above.

It is noted that steps S510 to S530 are the same as the corresponding steps S210 to S230 discussed above with respect to FIG. 2.

At step S540, the graph representing the set of media objects is generated. The generated graph is the graph $G_q$ discussed above with respect to FIG. 4. Each node of the graph corresponds to a media object of the set of media objects, and each edge between two nodes of the graph represents a similarity between the media parts of the two nodes. Each node of the graph is labeled with the set of features $x_{q,d_i}$. Each edge between two nodes is labeled with a concatenation of the visual features of the respective two nodes.

At step S550, a final ranking score is computed by the neural network. As discussed above with respect to FIG. 4, an encoder representation of the features $x_{q,d_i}$ is computed by an encoder layer 410. The encoder layer 410 may be a multi-layer perceptron, optionally with ReLU activations.

The encoder representation of the features is inputted into a batch normalization layer 420. The output of the batch normalization layer 420 is inputted into graph neural network 430.

The graph neural network 430 may be any standard graph neural network or a graph convolutional network. It is noted that the graph neural network 430 may comprise a single cross-modal graph convolution layer or a plurality of cross-modal graph convolution layers.

The graph $G_q$ is inputted into each layer of the graph neural network 430. It is noted that the graph may first be encoded and an encoder representation of the graph is input into the graph neural network 430.

The graph neural network 430 computes a final node embedding based on the input. The graph neural network 430 outputs the final node embedding to a ranking output layer 440. It is noted that the ranking output layer 440 may be a multi-layer perceptron or a linear projection layer. The ranking output layer 440 computes the final ranking score by projecting the final node embedding to a real-value score.

Finally, at step S560, the media objects are displayed to the user via the user interface. The media objects may be displayed in a list ranked according to the final relevance score.

It is worth to noting that, similar to the network of FIGS. 1 and 2, the network of FIGS. 4 and 5 is listwise by design: an example in a batch is not a single image in isolation, but all the candidate images for a given query, that are re-ranked in a one-shot manner. In the end, the learning to rank task is formulated as learning to rank nodes in a graph, and this generalizes the mechanism of pseudo-relevance feedback in cross-modal search. Contrary to joint embedding techniques, the technique described above is not re-learning to project images to a latent space, but rather learning to aggregate optimally the information provided by both modalities.

To validate the approach described in the embodiments of FIGS. 4 and 5, experiments were conducted on the dataset used in the "MediaEval17, Retrieving Diverse Social Images Task" challenge. Specific implementation details for this dataset are the same as described above with respect to FIGS. 1 and 2.

Given the limited number of queries in the training set, a 5-fold cross-validation was conducted. The queries were randomly split into five folds. The model was trained on 4 folds, and evaluated on the remaining one. This procedure was repeated 5 times. The average validation performance on MAP (mean Average Precision) was used to select the best model configuration. Then the best configuration was retrained on the full training set, and the performance on the test set was reported, for the MAP, P@5, P@20, nDCG@5 and nDCG@20.

The models were trained using stochastic gradient descent with batch size 5, i.e. 5 graphs (queries) per batch. The learning rate (which is crucial in this low data regime), the number of convolution layers, the latent dimension of nodes, the number of epochs, and the dimension of the learning to rank layer (as well as it's dropout rate) were tuned.

Batch normalization was used between each convolution layer, and the Adam optimizer was used for training.

The comparison between the best run of the cross-modal similarity measure for the challenge and the method described with respect to FIGS. 4 and 5 can be found in Table 2, as illustrated in FIG. 8. Significant improvement with respect to the cross-media similarity is indicated with * (p-value <0.05). Specifically, the graph is defined by a nearest neighbor graph (based on the visual similarities), with k=100, and the hyperparameters are chosen according to the validation strategy. The performance degrades as the number of convolution layers is increased: the best performance is obtained with a single one.

Although the above embodiments have been described in the context of method steps, they also represent a description of a corresponding component, module or feature of a corresponding apparatus or system.

Some or all of the method steps may be implemented by a computer in that they are executed by (or using) a processor, a microprocessor, an electronic circuit or processing circuitry.

The embodiments described above may be implemented in hardware or in software. The implementation can be performed using a non-transitory storage medium such as a computer-readable storage medium, for example a floppy disc, a DVD, a Blu-Ray, a CD, a ROM, a PROM, and EPROM, an EEPROM or a FLASH memory. Such computer-readable media can be any available media that can be accessed by a general-purpose or special-purpose computer system.

Generally, embodiments can be implemented as a computer program product with a program code or computer-executable instructions, the program code or computer-executable instructions being operative for performing one of the methods when the computer program product runs on a computer. The program code or the computer-executable instructions may, for example, be stored on a computer-readable storage medium.

In an embodiment, a storage medium (or a data carrier, or a computer-readable medium) comprises, stored thereon, the computer program or the computer-executable instructions for performing one of the methods described herein when it is performed by a processor. In a further embodiment, an apparatus comprises one or more processors and the storage medium mentioned above.

In a further embodiment, an apparatus comprises means, for example processing circuitry like e.g. a processor communicating with a memory, the means being configured to, or adapted to, perform one of the methods described herein.

A further embodiment comprises a computer having installed thereon the computer program or instructions for performing one of the methods described herein.

Figure 6:
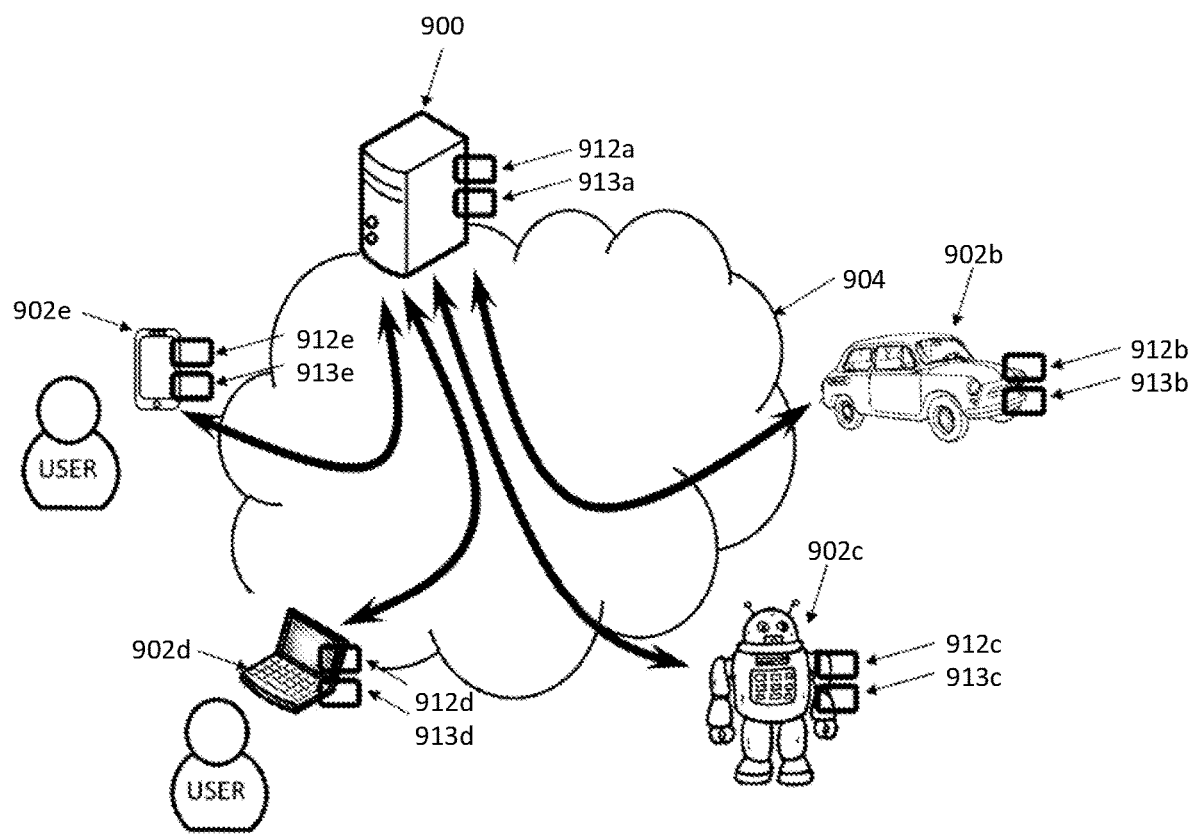
FIG. 6 illustrates an example of architecture in which the disclosed methods may be performed.

The above-mentioned methods and embodiments may be implemented within an architecture such as illustrated in FIG. 6, which comprises server 900 and one or more client devices 902 that communicate over a network 904 (which may be wireless and/or wired) such as the Internet for data exchange. Server 900 and the client devices 902 include a data processor 912 and memory 913 such as a hard disk. The client devices 902 may be any device that communicates with server 900, including autonomous vehicle 902b, robot 902c, computer 902d, or cell phone 902e.

More precisely in an embodiment, the techniques according to the embodiments of FIGS. 1 through 5 may be performed at server 900. In other embodiments, the techniques according to the embodiments of FIGS. 1 through 5 may be performed together with or at one or more client devices 902.

The server 900 and client devices 902 may be coupled to a memory 913 (e.g., storing an embodiment of a cross-modal information retrieval method herein described) to a user interface (e.g., keyboard, mouse, microphone, camera, etc.) for receiving input (e.g., a search query) from a user and a user interface (e.g., a display, speaker, LEDs, etc.) for providing output (e.g., query results) to a user. In yet other embodiments, the techniques described in the embodiments may be performed at a different server or clients, or on a plurality of servers or clients in a distributed manner.

While some specific embodiments have been described in detail above, it will be apparent to those skilled in the art that various modifications, variations, and improvements of the embodiments may be made in the light of the above teachings and within the content of the appended claims without departing from the intended scope of the embodiments.

In addition, those areas in which it is believed that those of ordinary skill in the art are familiar have not been described herein in order not to unnecessarily obscure the embodiments described herein.

Accordingly, it is to be understood that the embodiments are not to be limited by the specific illustrative embodiments, but only by the scope of the appended claims.

A computer-implemented method of performing cross-modal information retrieval using a neural network comprises (a) in response to a search query, obtaining a set of media objects, wherein each media object of the set of media objects comprises a text part and a media part; (b) labelling each media object of the set of media objects with a set of features; (c) generating an encoded representation of the set of features; (d) generating a graph representing the set of media objects, wherein each node of the graph corresponds to a media object of the set of media objects, wherein each node of the graph is labeled with a set of features corresponding to the text part of the respective media object, and wherein each edge between two nodes of the graph represents a similarity between the media parts of the two nodes; (e) computing, from the encoded representation of the set of features, a first relevance score for each media object of the set of media objects that corresponds to a text-based score; (f) computing a second relevance score for each media object of the set of media objects by inputting the graph and the encoded representation of the set of features into a graph neural network; and (g) combining the first relevance score and the second relevance score for each media object to obtain a final ranking score for each media object, the final ranking score corresponding to a relevance of a respective media object to the search query.

The method may further comprise displaying, on a user interface, the media objects of the set of media objects ranked according to the final ranking score for each media object.

The method may further comprise (h) presenting, via a user interface, the media objects of the set of media objects ranked according to the final ranking score for each media object; and (i) receiving, via the user interface, the search query.

The computing of the first relevance score for each media object of the set of media objects may be realized by inputting, into a linear projection layer, the encoder representation of the set of features.

The computing of the second relevance score for each media object of the set of media objects may be realized by inputting the graph into the graph neural network, inputting the encoder representation of the set of features into the graph neural network, and inputting a final embedding for each node, generated by the graph neural network, into a ranking output layer.

The search query may be a text query.

The media part may comprise an image content item and a video content item, and wherein each edge between two nodes of the graph represents a visual similarity between the two nodes.

The media part may comprise one of an image content item and an audio content item, and wherein each edge between two nodes of the graph represents an audio similarity between the two nodes.

Each edge between two nodes of the graph may be weighted based on the similarity between the media parts of the two nodes.

The graph neural network may be adapted to adjust weights of edges between nodes of the graph to modulate what nodes and edges influence the graph.

The graph representing the set of media objects may be a k-nearest neighbor graph.

The text part may be based on a media object title.

The text part may be based on a tag.

The obtaining of the set of media objects may be realized by inputting the search query into a standard ranking algorithm and ranking, by the standard ranking algorithm, the set of media objects.

The set of features may comprise a feature obtained by ranking the media objects of the set of media objects using a standard ranking algorithm.

The feature obtained by ranking the media objects of the set of media objects using the standard ranking algorithm may correspond to a relevance of the text part of a respective media object to the search query.

The graph neural network may be a graph convolutional network.

The neural network may be trained on a known set of training media objects using backpropagation and a pointwise ranking loss function.

The neural network may be trained on a known set of training media objects using backpropagation and a pairwise ranking loss function.

The neural network may be trained on a known set of training media objects using backpropagation and a listwise ranking loss function.

The graph neural network may be a plurality of cross-modal graph convolution layers.

The computing of the second relevance score for each media object of the set of media objects may be realized by projecting the final embedding for each node to a real-valued score using a linear projection layer.

The computing of the second relevance score for each media object of the set of media objects may be realized by projecting the final embedding for each node to a real-valued score using a multi-layer perceptron.

A system for performing cross-modal information retrieval comprises: a user interface for receiving a search query and presenting search results; and a memory for storing a neural network; the neural network including an encoder layer generating an encoded representation of a set of features, the set of features representing a label for each media object of a set of media objects, the set of media objects being obtained in response to the search query, each media object of the set of media objects having a text part and a media part; a linear projection layer for computing, from the encoded representation of the set of features, a first relevance score for each media object of the set of media objects that corresponds to a text-based score; a graph neural network for computing, from the encoded representation of the set of features and a graph representing the set of media objects, a final node embedding for each media object of the set of media objects, each node of the graph corresponding to a media object of the set of media objects, each node of the graph being labeled with a set of features corresponding to the text part of the respective media object, and each edge between two nodes of the graph represents a similarity between the media parts of the two nodes; a ranking output layer, operatively connected to said graph neural network, for computing a second relevance score for each media object of the set of media objects; a ranking score layer, operatively connected to said linear projection layer and said graph neural network for computing, from said first relevance score and said second relevance score, a final ranking score corresponding to a relevance of a respective media object to the search query; the user interface presenting the search results by displaying the media objects of the set of media objects ranked according to the final ranking score for each media object.

The search query may be a text query.

The media part may comprise an image content item and a video content item, and wherein each edge between two nodes of the graph represents a visual similarity between the two nodes.

The media part may comprise an image content item and an audio content item, and wherein each edge between two nodes of the graph represents an audio similarity between the two nodes.

Each edge between two nodes of the graph may be weighted based on the similarity between the media parts of the two nodes.

The graph neural network may be adapted to adjust weights of edges between nodes of the graph to modulate what nodes and edges influence the graph.

The graph representing the set of media objects may be a k-nearest neighbor graph.

The text part may be based on a media object title.

The text part may be based on a tag.

The system may further comprise a standard ranking algorithm layer for ranking the set of media objects.

The set of features may comprise a feature obtained by ranking the media objects of the set of media objects using a standard ranking algorithm.

The feature obtained by ranking the media objects of the set of media objects may correspond to a relevance of the text part of a respective media object to the search query.

The graph neural network may be a graph convolutional network.

The neural network may be trained on a known set of training media objects using backpropagation and a pointwise ranking loss function.

The neural network may be trained on a known set of training media objects using backpropagation and a pairwise ranking loss function.

The neural network may be trained on a known set of training media objects using backpropagation and a listwise ranking loss function.

The graph neural network may be a plurality of cross-modal graph convolution layers.

The ranking output layer may compute the second relevance score for each media object of the set of media objects by projecting the final embedding for each node to a real-valued score using a linear projection layer.

The ranking output layer may compute the second relevance score for each media object of the set of media objects by projecting the final embedding for each node to a real-valued score using a multi-layer perceptron.

It will be appreciated that variations of the above-disclosed embodiments and other features and functions, or alternatives thereof, may be desirably combined into many other different systems or applications. Also, various presently unforeseen or unanticipated alternatives, modifications, variations, or improvements therein may be subsequently made by those skilled in the art which are also intended to be encompassed by the description above and the following claims.

What is claimed is:

1. A computer-implemented method of performing cross-modal information retrieval using a neural network comprising:
    (a) in response to a search query, obtaining a set of media objects, wherein each media object of the set of media objects comprises a text part and a media part;
    (b) labelling each media object of the set of media objects with a set of features;
    (c) generating an encoded representation of the set of features;
    (d) generating a graph representing the set of media objects, wherein each node of the graph corresponds to a media object of the set of media objects, wherein each node of the graph is labeled with a set of features corresponding to the text part of the respective media object, and wherein each edge between two nodes of the graph represents a similarity between the media parts of the two nodes;
    (e) computing, from the encoded representation of the set of features, a first relevance score for each media object of the set of media objects that corresponds to a text-based score;
    (f) computing a second relevance score for each media object of the set of media objects by inputting the graph and the encoded representation of the set of features into a graph neural network; and
    (g) combining the first relevance score and the second relevance score for each media object to obtain a final ranking score for each media object, the final ranking score corresponding to a relevance of a respective media object to the search query.

2. The method as claimed in claim 1, further comprising:
    (h) displaying, on a user interface, the media objects of the set of media objects ranked according to the final ranking score for each media object.

3. The method of claim 1, further comprising:
    (h) presenting, via a user interface, the media objects of the set of media objects ranked according to the final ranking score for each media object; and
    (i) receiving, via the user interface, the search query.

4. The method as claimed in claim 1, wherein said computing the first relevance score for each media object of the set of media objects is realized by inputting, into a linear projection layer, the encoder representation of the set of features;
    said computing the second relevance score for each media object of the set of media objects is realized by inputting the graph into the graph neural network, inputting the encoder representation of the set of features into the graph neural network, and inputting a final embedding for each node, generated by the graph neural network, into a ranking output layer.

5. The method as claimed in claim 1, wherein the search query is a text query.

6. The method as claimed in claim 4, wherein the search query is a text query.

7. The method as claimed in claim 1, wherein the media part comprises an image content item and a video content item, and wherein each edge between two nodes of the graph represents a visual similarity between the two nodes.

8. The method as claimed in claim 4, wherein the media part comprises an image content item and a video content item, and wherein each edge between two nodes of the graph represents a visual similarity between the two nodes.

9. The method as claimed in claim 1, wherein the media part comprises one of an image content item and an audio content item, and wherein each edge between two nodes of the graph represents an audio similarity between the two nodes.

10. The method as claimed in claim 4, wherein the media part comprises one of an image content item and an audio content item, and wherein each edge between two nodes of the graph represents an audio similarity between the two nodes.

11. The method as claimed in claim 1, wherein each edge between two nodes of the graph is weighted based on the similarity between the media parts of the two nodes.

12. The method as claimed in claim 1, wherein the graph neural network is adapted to adjust weights of edges between nodes of the graph to modulate what nodes and edges influence the graph.

13. The method as claimed in claim 11, wherein the graph neural network is adapted to adjust weights of edges between nodes of the graph to modulate what nodes and edges influence the graph.

14. The method as claimed in claim 1, wherein the graph representing the set of media objects is a k-nearest neighbor graph.

15. The method as claimed in claim 11, wherein the graph representing the set of media objects is a k-nearest neighbor graph.

16. The method as claimed in claim 13, wherein the graph representing the set of media objects is a k-nearest neighbor graph.

17. The method as claimed in claim 1, wherein the text part is based on a media object title.

18. The method as claimed in claim 1, wherein the text part is based on a tag.

19. The method as claimed in claim 17, wherein the text part is based on a tag.

20. The method as claimed in claim 1, wherein said obtaining the set of media objects is realized by inputting the search query into a standard ranking algorithm and ranking, by the standard ranking algorithm, the set of media objects.

21. The method as claimed in claim 1, wherein the set of features comprises a feature obtained by ranking the media objects of the set of media objects using a standard ranking algorithm.

22. The method as claimed in claim 21, wherein the feature obtained by ranking the media objects of the set of media objects using the standard ranking algorithm corresponds to a relevance of the text part of a respective media object to the search query.

23. The method as claimed in claim 1, wherein the graph neural network is a graph convolutional network.

24. The method as claimed in claim 1, wherein the neural network is trained on a known set of training media objects using backpropagation and a pointwise ranking loss function.

25. The method as claimed in claim 1, wherein the neural network is trained on a known set of training media objects using backpropagation and a pairwise ranking loss function.

26. The method as claimed in claim 1, wherein the neural network is trained on a known set of training media objects using backpropagation and a listwise ranking loss function.

27. The method as claimed in claim 1, wherein the graph neural network is a plurality of cross-modal graph convolution layers.

28. The method as claimed in claim 4, wherein said computing the second relevance score for each media object of the set of media objects is realized by projecting the final embedding for each node to a real-valued score using a linear projection layer.

29. The method as claimed in claim 4, wherein said computing the second relevance score for each media object of the set of media objects is realized by projecting the final embedding for each node to a real-valued score using a multi-layer perceptron.

30. A system for performing cross-modal information retrieval comprising:
a user interface for receiving a search query and presenting search results; and
a memory for storing a neural network;
said neural network including,
an encoder layer generating an encoded representation of a set of features, the set of features representing a label for each media object of a set of media objects, the set of media objects being obtained in response to the search query, each media object of the set of media objects having a text part and a media part,
a linear projection layer for computing, from the encoded representation of the set of features, a first relevance score for each media object of the set of media objects that corresponds to a text-based score,
a graph neural network for computing, from the encoded representation of the set of features and a graph representing the set of media objects, a final node embedding for each media object of the set of media objects, each node of the graph corresponding to a media object of the set of media objects, each node of the graph being labeled with a set of features corresponding to the text part of the respective media object, and each edge between two nodes of the graph represents a similarity between the media parts of the two nodes,
a ranking output layer, operatively connected to said graph neural network, for computing a second relevance score for each media object of the set of media objects, and
a ranking score layer, operatively connected to said linear projection layer and said graph neural network for computing, from said first relevance score and said second relevance score, a final ranking score corresponding to a relevance of a respective media object to the search query;
said user interface presenting the search results by displaying the media objects of the set of media objects ranked according to the final ranking score for each media object.

31. The system as claimed in claim 30, wherein the search query is a text query.

32. The system as claimed in claim 30, wherein the media part comprises an image content item and a video content item, and wherein each edge between two nodes of the graph represents a visual similarity between the two nodes.

33. The neural network as claimed in claim 30, wherein the media part comprises an image content item and an audio content item, and wherein each edge between two nodes of the graph represents an audio similarity between the two nodes.

34. The system as claimed in claim 30, wherein each edge between two nodes of the graph is weighted based on the similarity between the media parts of the two nodes.

35. The system as claimed in claim 30, wherein said graph neural network is adapted to adjust weights of edges between nodes of the graph to modulate what nodes and edges influence the graph.

36. The system as claimed in claim 34, wherein said graph neural network is adapted to adjust weights of edges between nodes of the graph to modulate what nodes and edges influence the graph.

37. The system as claimed in claim 30, wherein the graph representing the set of media objects is a k-nearest neighbor graph.

38. The system as claimed in claim 34, wherein the graph representing the set of media objects is a k-nearest neighbor graph.

39. The system as claimed in claim 36, wherein the graph representing the set of media objects is a k-nearest neighbor graph.

40. The system as claimed in claim 30, wherein the text part is based on a media object title.

41. The system as claimed in claim 30, wherein the text part is based on a tag.

42. The system as claimed in claim 40, wherein the text part is based on a tag.

43. The system as claimed in claim 30, further comprising:
a standard ranking algorithm layer for ranking the set of media objects.

44. The system as claimed in claim 30, wherein the set of features comprises a feature obtained by ranking the media objects of the set of media objects using a standard ranking algorithm.

45. The system as claimed in claim 44, wherein the feature obtained by ranking the media objects of the set of media objects corresponds to a relevance of the text part of a respective media object to the search query.

46. The system as claimed in claim 30, wherein said graph neural network is a graph convolutional network.

47. The system as claimed in claim 30, wherein the neural network is trained on a known set of training media objects using backpropagation and a pointwise ranking loss function.

48. The system as claimed in claim 30, wherein the neural network is trained on a known set of training media objects using backpropagation and a pairwise ranking loss function.

49. The system as claimed in claim 30, wherein the neural network is trained on a known set of training media objects using backpropagation and a listwise ranking loss function.

50. The system as claimed in claim 30, wherein said graph neural network is a plurality of cross-modal graph convolution layers.

51. The system as claimed in claim 30, wherein said ranking output layer computes the second relevance score for each media object of the set of media objects by projecting the final embedding for each node to a real-valued score using a linear projection layer.

52. The system as claimed in claim 30, wherein said ranking output layer computes the second relevance score for each media object of the set of media objects by projecting the final embedding for each node to a real-valued score using a multi-layer perceptron.

* * * * *